(12) United States Patent  
Saito et al.

(10) Patent No.: US 8,095,095 B2  
(45) Date of Patent: Jan. 10, 2012

(54) BAND SWITCH CONTROL APPARATUS FOR INTERMEDIATE FREQUENCY FILTER

(75) Inventors: Yasuji Saito, Gunma (JP); Masaya Suto, Gunma (JP)

(73) Assignee: Semiconductor Components Industries, LLc, Phoenix, AZ (US)

( * ) Notice: Subject to any disclaimer, the term of this patent is extended or adjusted under 35 U.S.C. 154(b) by 621 days.

(21) Appl. No.: 12/201,268

(22) Filed: Aug. 29, 2008

(65) Prior Publication Data

US 2009/0061806 A1    Mar. 5, 2009

(30) Foreign Application Priority Data

Aug. 30, 2007 (JP) ................................. 2007-224557

(51) Int. Cl.
*H04B 1/18* (2006.01)
*H04B 1/06* (2006.01)
*H04B 7/00* (2006.01)
*H04B 1/10* (2006.01)
*H04B 1/16* (2006.01)

(52) U.S. Cl. .................. 455/130; 455/188.1; 455/279.1; 455/296; 455/307; 455/339

(58) Field of Classification Search ............... 455/150.1, 455/166.2, 176.1–177.1, 180.1, 188.1, 278.1, 455/203–309, 339–340
See application file for complete search history.

(56) References Cited

U.S. PATENT DOCUMENTS

| | | | |
|---|---|---|---|
| 6,047,171 A * | 4/2000 | Khayrallah et al. | 455/266 |
| 6,178,314 B1 * | 1/2001 | Whikehart et al. | 455/188.1 |
| 6,501,944 B1 * | 12/2002 | Szydlowski et al. | 455/266 |
| 6,738,606 B1 * | 5/2004 | Kianush et al. | 455/254 |
| 6,957,054 B2 * | 10/2005 | Li | 455/296 |
| 7,181,184 B1 * | 2/2007 | Dimeo et al. | 455/296 |
| 7,221,917 B2 * | 5/2007 | Kroeger | 455/192.2 |
| 7,269,401 B2 * | 9/2007 | Saito et al. | 455/230 |
| 7,343,143 B2 * | 3/2008 | Gamou | 455/226.1 |
| 7,400,868 B2 * | 7/2008 | Fukusen et al. | 455/150.1 |
| 7,421,262 B2 * | 9/2008 | Seo | 455/180.1 |
| 2006/0003718 A1 * | 1/2006 | Oohata et al. | 455/186.1 |
| 2006/0281427 A1 * | 12/2006 | Isaac et al. | 455/209 |

FOREIGN PATENT DOCUMENTS

| | | |
|---|---|---|
| JP | 2003-143025 | 5/2003 |
| JP | 2003-174373 | 6/2003 |
| JP | 2004-260528 | 9/2004 |
| JP | 2006-333074 | 12/2006 |

* cited by examiner

*Primary Examiner* — Simon Nguyen  
(74) *Attorney, Agent, or Firm* — Robert F. Hightower

(57) ABSTRACT

A band-switch control apparatus for an intermediate-frequency filter comprising: an adjacent interference-signal detecting unit for detecting an adjacent interference-signal, having a frequency adjacent to the desired frequency, superimposed on a reception signal having a frequency tuned to a desired frequency; a modulation-degree detecting unit for detecting a modulation degree of the reception signal; a bandwidth selecting unit for selecting a pass bandwidth of the intermediate-frequency filter corresponding to the amplitude of the adjacent interference-signal; and a band-narrowing suppression control unit for selecting a lower limit value of the pass bandwidth of the intermediate-frequency filter corresponding to the demodulation degree, the intermediate-frequency filter for passing, with a variable pass bandwidth, an intermediate-frequency signal obtained by frequency converting the reception signal, and changing the pass bandwidth selected by the bandwidth selecting unit to the lower limit value, if the pass bandwidth selected by the bandwidth selecting unit is smaller than the value.

12 Claims, 18 Drawing Sheets

| | $A<Ath1$ | $Ath1 \leqq A<Ath2$ | $A \geqq Ath2$ |
|---|---|---|---|
| $M<Mth2$ | BAND BROADENING | $Bw2 \rightarrow Bw2$ | $Bw1 \rightarrow Bw1$ |
| $Mth2 \leqq M<Mth1$ | BAND BROADENING | $Bw2 \rightarrow Bw2$ | $Bw1 \rightarrow Bw2$ |
| $M \geqq Mth1$ | BAND BROADENING | $Bw2 \rightarrow Bw3$ | $Bw1 \rightarrow Bw3$ |

FIG. 3

| | $M<Mth$ | $M \geqq Mth$ |
|---|---|---|
| $A<Ath1$ | BAND BROADENING | BAND BROADENING |
| $Ath1 \leqq A<Ath2$ | Bw1 | Bw2 |
| $A \geqq Ath2$ | Bw1 | Bw1 |

FIG. 18

{{BAND SWITCH CONTROL APPARATUS FOR INTERMEDIATE FREQUENCY FILTER}}

CROSS-REFERENCE TO RELATED APPLICATION

This application claims the benefit of priority to Japanese Patent Application No. 2007-224557, filed Aug. 30, 2007, of which full contents are incorporated herein by reference.

BACKGROUND OF THE INVENTION

1. Field of the Invention

The present invention relates to a band switch control apparatus for an intermediate frequency filter.

2. Description of the Related Art

With regard to an intermediate frequency filter (hereinafter referred to as IF filter) extracting an intermediate frequency component of a reception signal, there has been proposed a receiving apparatus employing a band switching system of switching the pass bandwidth of the IF filter based on an adjacent interference signal and a modulation degree (see Japanese Patent Application Laid-Open Publication No. 2003-143025).

FIG. 17 is a flowchart of an operation flow of the receiving apparatus.

Based on a reception signal (frequency modulated signal) received from an antenna, an adjacent interference signal A superimposed on the reception signal and a modulation degree M of the reception signal are detected (S1701), and amplitude (level) of the adjacent interference signal A is first compared with a predetermined threshold value Ath1 (S1702). If the adjacent interference signal A is greater than the threshold value Ath1 (S1702: YES), the amplitude of the adjacent interference signal A is further compared with a predetermined threshold value Ath2 greater than the threshold value Ath1 (S1703). If the amplitude of the adjacent interference signal A is smaller than the threshold value Ath1, the band broadening control is performed to broaden the pass bandwidth Bw of the IF filter step-by-step within a range from the minimum value Bw1 to the maximum value Bw3 (Bw1→Bw2→Bw3) (S1704). A reason why the pass bandwidth Bw of the IF filter is narrowed when the adjacent interference signal A is increased is that if the pass bandwidth Bw of the IF filter is broadened when the adjacent interference signal A is increased, interference tends to occur.

If the amplitude of the adjacent interference signal A is greater than the threshold value Ath2 (S1703: YES), a first bandwidth Bw1 is selected as the pass bandwidth Bw of the IF filter (S1705). If the amplitude of the adjacent interference signal A is smaller than the threshold value Ath2 (S1703: NO), the modulation degree M is compared with a predetermined threshold value Mth (S1706). If the modulation degree M is greater than the threshold value Mth (S1706: YES), a second bandwidth Bw2 greater than the first bandwidth Bw1 is selected as the pass bandwidth Bw of the IF filter (S1707). If the modulation degree M is smaller than the threshold value Mth (S1706: NO), the first bandwidth Bw1 is selected as the pass bandwidth Bw of the IF filter (S1705). A reason why the pass bandwidth Bw of the IF filter is broadened when the modulation degree M is increased is that if the pass bandwidth Bw is narrowed when the modulation degree M is increased, great amount of the FM detected audio signal component is lost and thus the audio signal waveform tends to be distorted.

In a table of FIG. 18, there is listed the pass bandwidth Bw of the IF filter to be selected according to the amplitude of the adjacent interference signal A and the modulation degree M in accordance with the flowchart shown in FIG. 17. If the adjacent interference signal A is equal to or greater than the threshold value Ath1 and smaller than the threshold value Ath2 and the modulation degree M is greater than the threshold value Mth, for example, the bandwidth switching according to the modulation degree M is prioritized to select the second bandwidth Bw2 greater than the first bandwidth Bw1, and thus generation of the waveform distortion in the audio signal is suppressed. On the other hand, if the modulation degree M is smaller than the threshold value Mth, the bandwidth switching according to the adjacent interference signal A is prioritized to select the first bandwidth Bw1 narrower than the second bandwidth Bw2, and thus generation of interference is suppressed. In this way, by changing the pass bandwidth Bw based on the amplitude of the adjacent interference signal A and the modulation degree M, there can be achieved a receiving condition with less waveform distortion in the audio signal or less interference.

As described above, if the adjacent interference signal A is equal to or greater than the threshold value Ath1 and smaller than the threshold value Ath2 and the modulation degree M is less than the threshold value Mth, for example, there is selected the first bandwidth Bw1 that is the smallest as the pass bandwidth Bw. However, in this case, since the amplitude of the adjacent interference signal A is less than the threshold value Ath2, the first bandwidth Bw1, which is the narrowest as the pass bandwidth Bw, is not required to be selected for preventing the interference due to the adjacent interference signal A, so that the second bandwidth Bw2 broader than the first bandwidth Bw1 is practically adequate to be select. In the conventional band switching, if the modulation degree M is small, the bandwidth of the IF filter is always reduced even when the effect of the adjacent interference is small. Therefore, the audio quality may be deteriorated under the condition that the effect of the adjacent interference is small.

Since a time constant practically exists in the detection of the modulation degree M, for example, even if the modulation degree M changes from a state of a value less than the threshold value Mth to a momentary state of a value exceeding the threshold value Mth, the momentary state may not be detected. In this case, when the modulation degree M is momentarily increased, the pass bandwidth Bw is normally required to be increased to restrain the waveform distortion in the audio signal. However, the momentary state in the modulation degree M may not be detected due to the time constant, to delay the band broadening control, so that the bandwidth change is not made from the first bandwidth Bw1, which is the narrowest, resulting in the waveform distortion in the audio signal.

SUMMARY OF THE INVENTION

A band switch control apparatus for an intermediate frequency filter according to an aspect of the present invention, comprises: an adjacent interference signal detecting unit configured to detect an adjacent interference signal superimposed on a reception signal having a frequency tuned to a desired frequency, the adjacent interference signal having a frequency adjacent to the desired frequency; a modulation-degree detecting unit configured to detect a modulation degree of the reception signal; a bandwidth selecting unit configured to select a pass bandwidth of the intermediate frequency filter corresponding to the amplitude of the adjacent interference signal; and a band-narrowing suppression control unit configured to select a lower limit value of the pass bandwidth of the intermediate frequency filter corresponding to the demodulation degree, the intermediate frequency filter being configured to pass, with a variable pass bandwidth, an intermediate frequency signal obtained by frequency converting the reception signal, and change the pass bandwidth selected by the bandwidth selecting unit to the lower limit value, if the pass bandwidth selected by the bandwidth selecting unit is smaller than the lower limit value.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 3 is an explanatory diagram of a band switching process of a band switch control apparatus for an intermediate frequency filter according to a first embodiment of the present invention;

FIG. 18 is an explanatory diagram of an intermediate frequency filter band switch process.

DETAILED DESCRIPTION OF THE INVENTION

At least the following details will become apparent from descriptions of this specification and of the accompanying drawings.

First Embodiment

==Overall Configuration of Receiving Apparatus==

Figure 1:
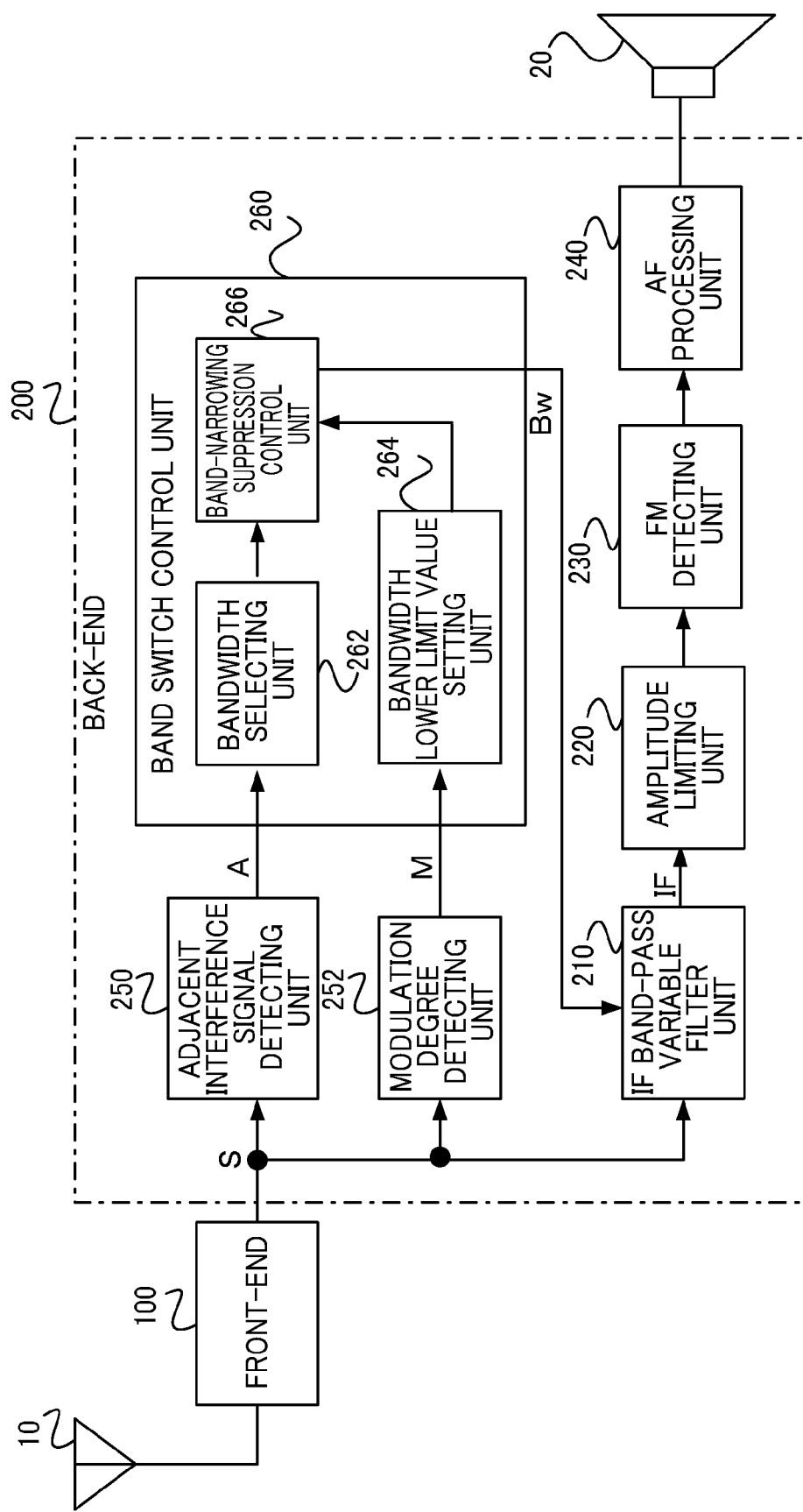
FIG. 1 is a diagram showing a configuration of a receiving apparatus including a band switch control apparatus for an intermediate frequency filter according to a first embodiment of the present invention.

FIG. 1 is a diagram showing a configuration of a receiving apparatus including a band switch control apparatus for an intermediate frequency filter according to a first embodiment of the present invention. Although it is assumed that a receiving apparatus of FIG. 1 is a superheterodyne monaural FM receiver including a front-end 100 and a back-end 200, the receiving apparatus may be an FM stereo receiver, for example. Each of the front-end 100 and the back-end may be made up of an integrated circuit.

The front end 100 executes an analog front-end processing as an FM tuner function for a reception signal (frequency modulated signal) received with an antenna 10 and is configured as a one-chip integrated circuit in an embodiment of the present invention. The analog front-end processing is processing of performing radio (high) frequency amplification for the reception signal having a frequency tuned to a frequency of desired wave (desired frequency) and mixing the amplified reception signal with a local oscillation signal, that is processing before a signal having an intermediate frequency component is obtained. The intermediate frequency is a difference between the reception frequency of the reception signal and the oscillation frequency of the local oscillation circuit. The signal of the intermediate frequency component is amplitude-limited by an automatic gain control unit (AGC) not shown and is then supplied to the back-end 200.

The back-end 200 executes a digital back-end processing for a digital intermediate frequency signal S (hereinafter referred to as IF signal S), which is obtained by A/D converting an output of the front-end 100 with an A/D convertor not shown, and is configured with a DSP (digital signal processor), for example, in an embodiment of the present invention. The DSP is made up of a one-chip integrated circuit. Specifically, the back-end 200 is mainly made up of an IF variable band-pass filter unit 210, an amplitude limiting unit 220, an FM detecting unit 230, an AF (audio frequency) processing unit 240, an adjacent interference signal detecting unit 250, a modulation-degree detecting unit 252, and a band switch control unit 260. The receiving apparatus of FIG. 1 also includes functions for stable reception, such as an automatic frequency control unit (AFC), an automatic gain control unit (AGC), and a mute processing unit (all not shown) in addition to the above basic configuration.

The IF variable band-pass filter unit 210 is a band pass filter that allows the IF signal S obtained by A/D converting the output of the front-end 100 to pass therethrough with a pass bandwidth Bw. The center frequency of the pass bandwidth Bw is the frequency of the IF signal. That is, only the IF signal is extracted by removing unwanted frequency components from the output of the front-end 100. The IF variable band-pass filter unit 210 varies the pass bandwidth Bw based on an adjacent interference signal A and a modulation degree M.

The amplitude limiting unit 220, the FM detecting unit 230, and the AF processing unit 240 are provided as subsequent stages of the IF variable band-pass filter unit 210. The amplitude limiting unit 220 limits the amplitude of the IF signal output from the IF variable band-pass filter unit 210 to a constant amplitude. The FM detecting unit 230 performs FM detection based on the IF signal limited to the constant amplitude by the amplitude limiting unit 220, to obtain a demodulation signal (audio signal). The AF processing unit 240 executes the AF processing for the demodulation signal (audio signal) output from the FM detecting unit 230 and then reproduces the signal through a speaker 20.

The adjacent interference signal detecting unit 250, the modulation-degree detecting unit 252, and the band switch control unit 260 make up the band switch control apparatus for the intermediate frequency filter according to a first embodiment of the present invention.

The adjacent interference signal detecting unit 250 detects the adjacent interference signal A based on the digital signal S output from the front-end 100. The adjacent interference signal A is an interference signal having a frequency adjacent to a desired frequency of a desired station and causes a state of interference, so-called adjacent interference for transmission signals from the desired station. As an arrangement for detecting the adjacent interference signal A, there can be employed, for example, a technique of detecting the adjacent interference signal A from a result obtained by comparing energy of a broadband that can include the adjacent wave and a narrowband that cannot include the adjacent wave based on the desired frequency of the desired wave, a technique of detecting with an IF filter the adjacent interference signals A present each in the upper frequency band and the lower frequency band of the frequency of the desired wave, or a technique combining the both techniques (see, e.g., Japanese Patent Application Laid-Open Publication No. 2003-174373).

The modulation-degree detecting unit 252 detects the modulation degree M of the reception signal based on the output of the front-end 100. The modulation degree M is an index representing a degree of conversion (modulation) from a signal wave into a carrier wave and is accurately represented by a ratio between the maximum frequency shift and the signal-wave frequency (modulation index). In an arrangement for detecting the modulation degree M, for example, an average value of the output of the front-end 100 per predetermined period can be obtained as the modulation degree M (see, e.g., Japanese Patent Application Laid-Open Publication No. 2006-333074).

The band switch control unit 260 includes a bandwidth selecting unit 262, a bandwidth lower limit value setting unit 264, and a band-narrowing suppression control unit 266. The bandwidth selecting unit 262 selects the pass bandwidth Bw of the IF variable band-pass filter unit 210 corresponding to the amplitude of the adjacent interference signal A detected by the adjacent interference signal detecting unit 250 according to patterns defined in advance corresponding to the amplitude of the adjacent interference signal A. The bandwidth lower limit value setting unit 264 selects a pass bandwidth lower limit value MinBw corresponding to the modulation degree M detected by the modulation-degree detecting unit 252 according to patterns defined in advance corresponding to the modulation degrees M. The band-narrowing suppression control unit 266 changes the pass bandwidth Bw selected by the bandwidth selecting unit 262 to the pass bandwidth lower limit value MinBw, if the pass bandwidth Bw selected by the bandwidth selecting unit 262 is smaller than the pass bandwidth lower limit value MinBw of the bandwidth lower limit value setting unit 264.

==Outline of Intermediate Frequency Filter Band Switch Process==

Figure 2:
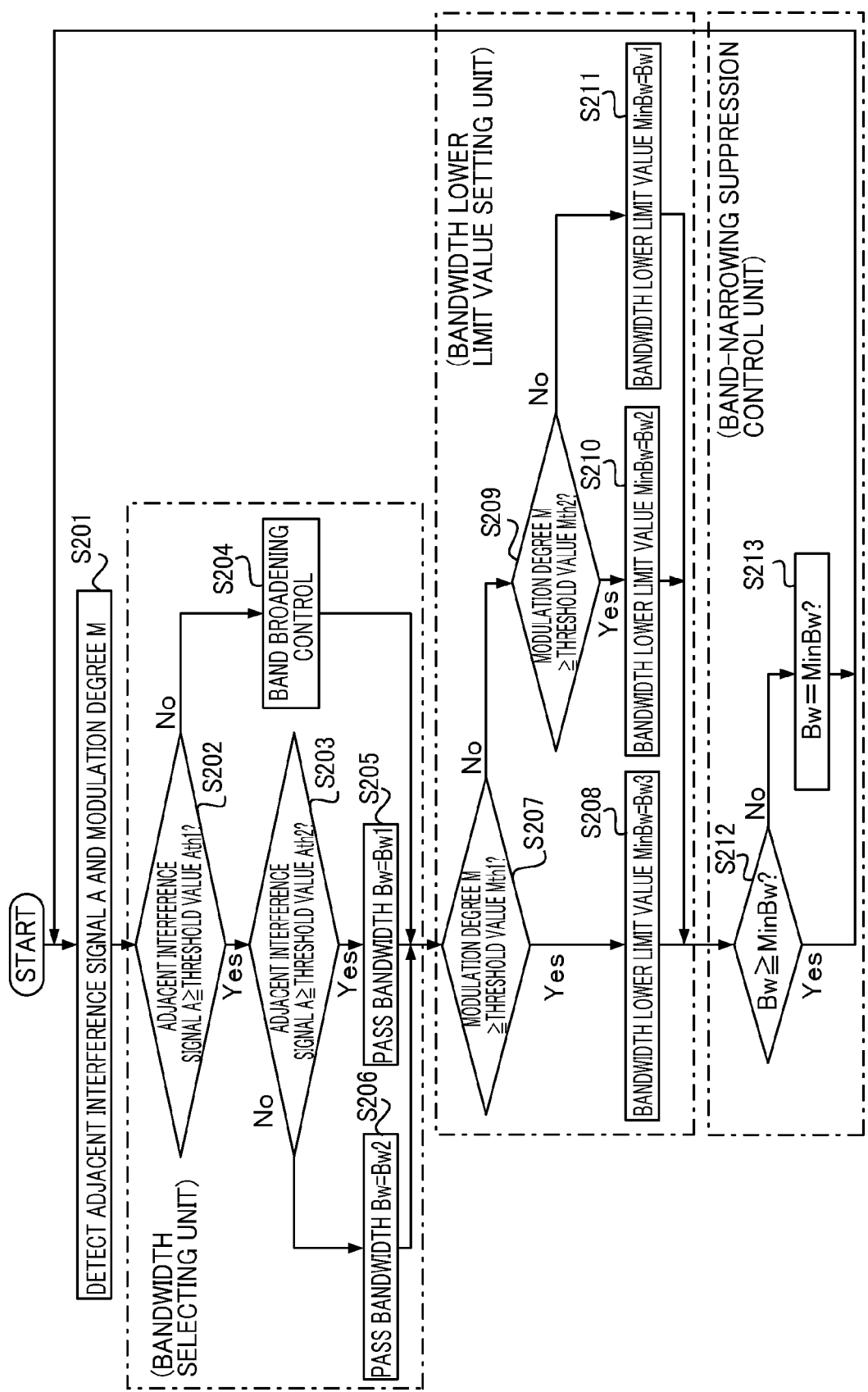
FIG. 2 is a flowchart of a band switching process of a band switch control apparatus for an intermediate frequency filter according to a first embodiment of the present invention.

FIG. 2 is an explanatory flowchart of an outline of a band switch process by the band switch control apparatus for the intermediate frequency filter according to a first embodiment of the present invention shown in FIG. 1. The following processing from S202 to S206 is performed by the bandwidth selecting unit 262; the following processing from S207 to S211 is performed by the bandwidth lower limit value setting unit 264; and the following process from S212 to S213 is performed by the band-narrowing suppression control unit 266.

Based on the reception signal received with the antenna 10, when the adjacent interference signal detecting unit 250 detects the adjacent interference signal A superimposed on the reception signal and the modulation-degree detecting unit 252 detects the modulation degree M of the reception signal (S201), the bandwidth selecting unit 262 compares the amplitude of the adjacent interference signal A with a predetermined threshold value Ath1 (S202). If the adjacent interference signal A is greater than the threshold value Ath1 ("second threshold value") (S202: YES), the amplitude of the adjacent interference signal A is further compared with a predetermined threshold value Ath2 ("first threshold value") greater than the threshold value Ath1 (S203). If the amplitude of the adjacent interference signal A is smaller than the threshold value Ath1, the band broadening control is performed to broaden the pass bandwidth Bw step-by-step (Bw1→Bw2→Bw3) (S204).

If the amplitude of the adjacent interference signal A is greater than the threshold value Ath2 (S203: YES), a first bandwidth Bw1 is selected as the pass bandwidth Bw (S205). If the amplitude of the adjacent interference signal A is smaller than the threshold value Ath2 (S203: NO), a second bandwidth Bw2 greater than the first bandwidth Bw1 is selected as the pass bandwidth Bw (S206). That is, as the adjacent interference signal A becomes greater, the pass bandwidth Bw of the IF variable band-pass filter unit 210 is made narrower in order to prevent the interference, in principle.

The bandwidth lower limit value setting unit 264 then compares the modulation degree M with a predetermined threshold value Mth1 ("fourth threshold value") (S207). If the modulation degree M is greater than the threshold value Mth1 (S207: YES), a third bandwidth Bw3 broader than the second bandwidth Bw2 is selected as the pass bandwidth lower limit value MinBw (S208). If the modulation degree M is smaller than the threshold value Mth1 (S207: NO), the modulation degree M is further compared with a predetermined threshold value Mth2 ("third threshold value") smaller than the threshold value Mth1 (S209). If the modulation degree M is greater than the threshold value Mth2 (S209: YES), the second bandwidth Bw2 is selected as the pass bandwidth lower limit value MinBw (S210). If the modulation degree M is smaller than the threshold value Mth2 (S209: NO), the first bandwidth Bw1 is selected as the pass bandwidth lower limit value MinBw (S211). That is, as the modulation degree M becomes greater, the pass bandwidth Bw of the IF variable band-pass filter unit 210 is made greater in order to prevent the waveform distortion, in principle.

The band-narrowing suppression control unit 266 compares the pass bandwidth Bw selected by the bandwidth selecting unit 262 with the pass bandwidth lower limit value MinBw set by the bandwidth lower limit value setting unit 264 (S212). If the pass bandwidth Bw is greater than the pass bandwidth lower limit value MinBw (S212: YES), the pass bandwidth Bw selected by the bandwidth selecting unit 262 is not changed, and if the pass bandwidth Bw is smaller than the pass bandwidth lower limit value MinBw (S212: NO), the pass bandwidth Bw selected by the bandwidth selecting unit 262 is changed to the pass bandwidth lower limit value MinBw (S213).

A table of FIG. 3 lists the pass bandwidth Bw of the IF variable band-pass filter unit 210 to be selected corresponding to the amplitude of the adjacent interference signal A and the modulation degree M in accordance with the above band switching.

If the adjacent interference signal A is less than the threshold value Ath1 and little consideration must be given to the effect of the adjacent interference, the band broadening control is performed to broaden the pass bandwidth Bw step-by-step within a range from the first bandwidth Bw1 to the third bandwidth Bw3.

If the adjacent interference signal A is equal to or greater than the threshold value Ath2 and the maximum consideration must be given to the effect of the adjacent interference, the first bandwidth Bw1, which is the narrowest, is selected as the pass bandwidth Bw, in principle. However, the band-narrowing suppression control is performed according to the modulation degree M so that the pass bandwidth Bw may be broadened from the first bandwidth Bw1 to the second bandwidth Bw2 or the third bandwidth Bw3 selected as the pass bandwidth lower limit value MinBw. Specifically, if the modulation degree M is equal to or greater than the threshold value Mth2 and smaller than the threshold value Mth1, for example, the bandwidth may be broadened from the first bandwidth Bw1 to the second bandwidth Bw2, and if the modulation degree M is equal to or greater than the threshold value Mth1, for example, the bandwidth may be broadened from the first bandwidth Bw1 to the third bandwidth Bw3.

If the adjacent interference signal A is equal to or greater than the threshold value Ath1 and smaller than the threshold value Ath2, consideration must be given to the adjacent interference to some extent, and the second bandwidth Bw2, which is the second narrowest bandwidth, is selected as the pass bandwidth Bw, in principle. However, the band-narrowing suppression control is performed according to the modulation degree M so that the pass bandwidth Bw may be broadened from the second bandwidth Bw2 to the third bandwidth Bw3 selected as the pass bandwidth lower limit value MinBw. Specifically, if the modulation degree M is greater than the threshold value Mth1, the bandwidth may be broadened from the second bandwidth Bw2 to the third bandwidth Bw3.

As described above, the band switching of the IF variable band-pass filter unit 210 is performed in two steps, which are the band narrowing control for suppressing the effect of the adjacent interference signal A and the band-narrowing suppression control for suppressing the waveform distortion of the modulation degree M. If the pass bandwidth Bw of the band narrowing filter (IF variable band-pass filter unit 210) selected to suppress the effect of the adjacent interference by the band narrowing control based on the adjacent interference signal A is narrower than the pass bandwidth lower limit value MinBw specified by the band-narrowing suppression control based on the modulation degree M, the pass bandwidth lower limit value MinBw is preferentially selected. Conversely, if the pass bandwidth Bw is greater than the pass bandwidth lower limit value MinBw, the pass bandwidth Bw selected based on the adjacent interference signal A is directly applied, as it is. As a result, the pass bandwidth Bw selected based on the adjacent interference signal A is not made further narrower as in the conventional case, thereby achieving a good reception state where both the interference based on the amplitude of the adjacent interference signal A and the waveform distortion based on the modulation degree M are suppressed in a balanced manner.

Even if a situation occurs where a momentary change in the modulation degree M is not detected due to the effect of the time constant when detecting the modulation degree M, the pass bandwidth Bw corresponding to the amplitude of the adjacent interference signal A is temporarily selected irrespective of the modulation degree M. Specifically, if the adjacent interference signal A is equal to or greater than the threshold value Ath2, the bandwidth is guaranteed to be equal to or greater than the first bandwidth Bw1, and if the adjacent interference signal A is equal to or greater than the threshold value Ath1 and smaller than the threshold value Ath2, bandwidth is guaranteed to be equal to or greater than the second bandwidth Bw2. Therefore, the first bandwidth Bw1 that is the narrowest is not selected as the pass bandwidth Bw when the adjacent interference signal A is equal to or greater than the threshold value Ath1 and smaller than the threshold value Ath2 as shown in FIG. 18, for example, and thus, even if the momentary change in the modulation degree M cannot be detected, the effect of not being detected can be reduced.

==Detailed Exemplary Configuration of Intermediate Frequency Filter Band Switch Control Apparatus==

A detailed exemplary configuration of the band switch control apparatus for the intermediate frequency filter according to a first embodiment will hereinafter be described with reference to FIGS. 4 to 9.

Figure 4:
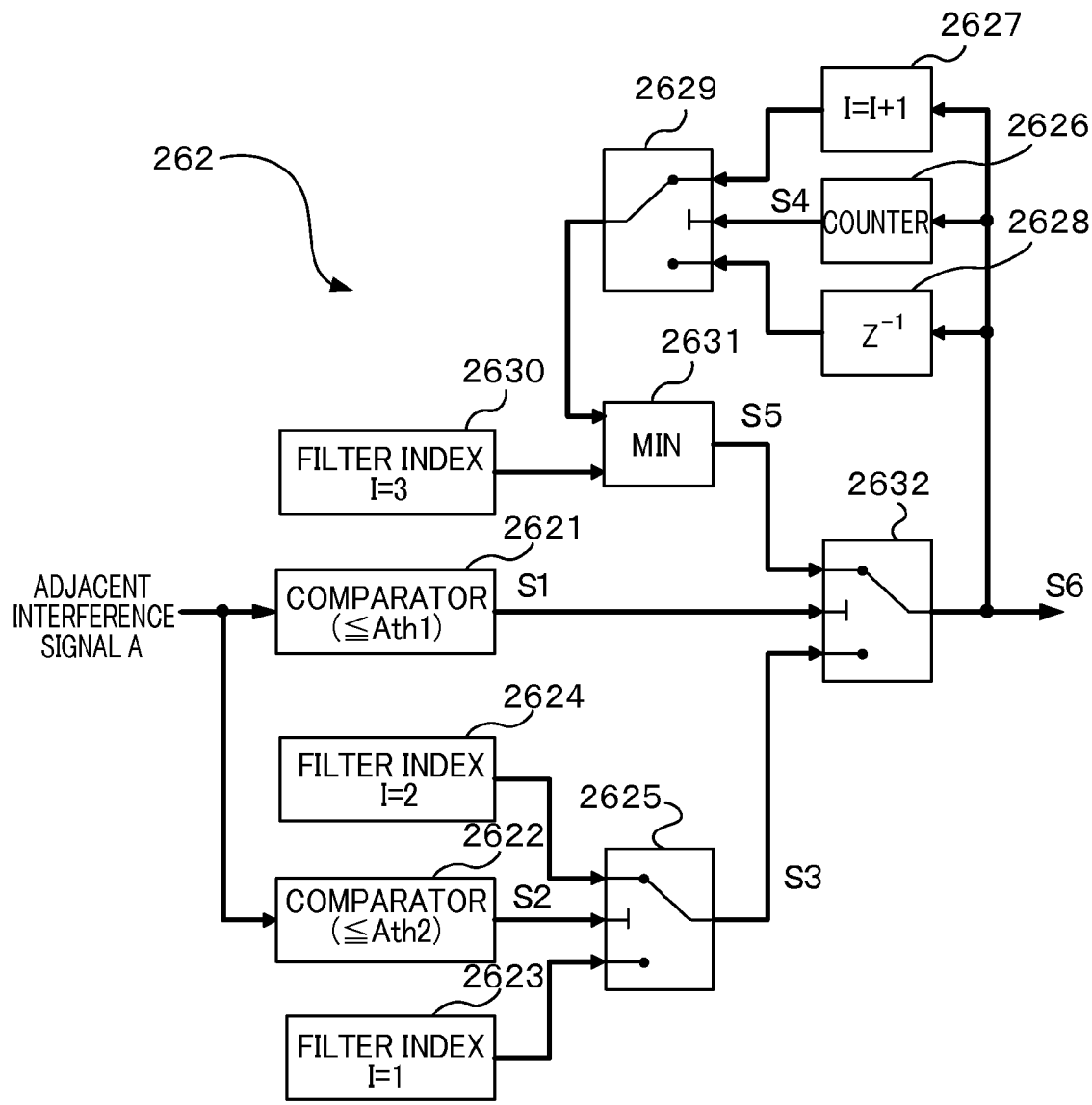
FIG. 4 is a diagram showing a configuration of a bandwidth selecting unit according to a first embodiment of the present invention.
Figure 5A:
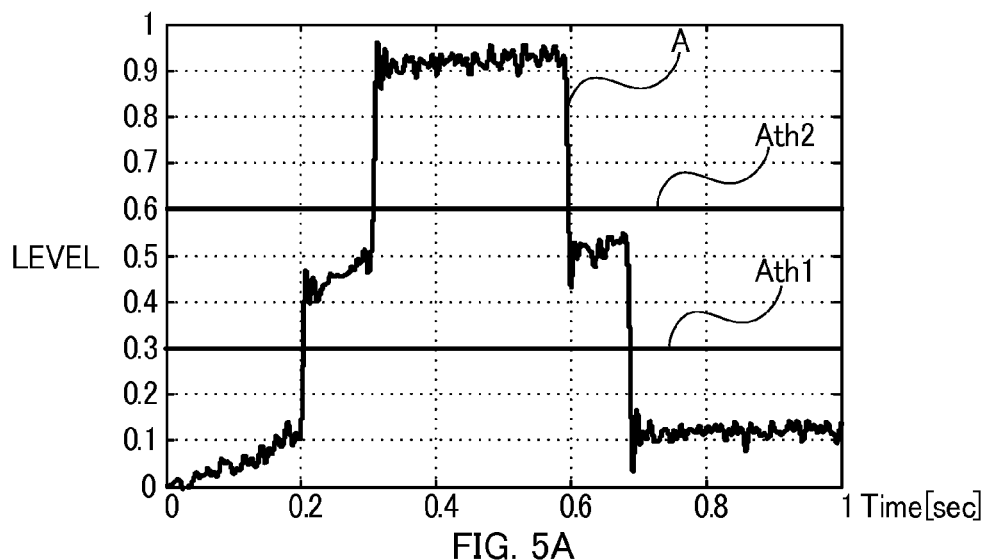
FIG. 5A is a waveform diagram showing a relationship between an adjacent interference signal A and threshold values of a bandwidth selecting unit according to a first embodiment of the present invention.
Figure 5B:
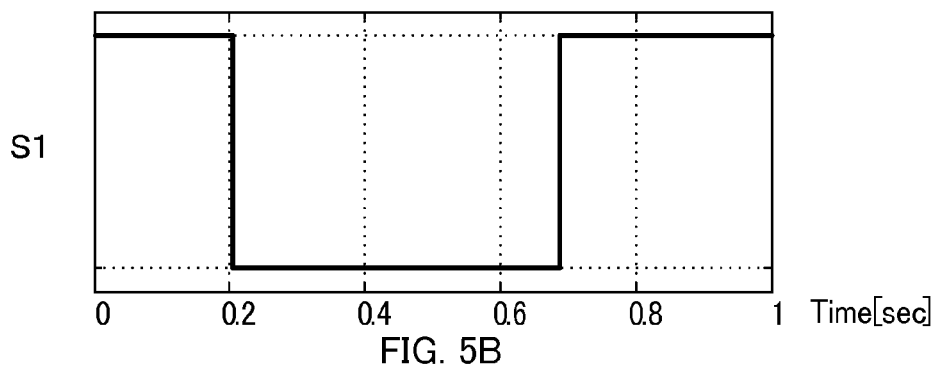
FIG. 5B is a waveform diagram of a signal S1 of a bandwidth selecting unit according to a first embodiment of the present invention.
Figure 5C:
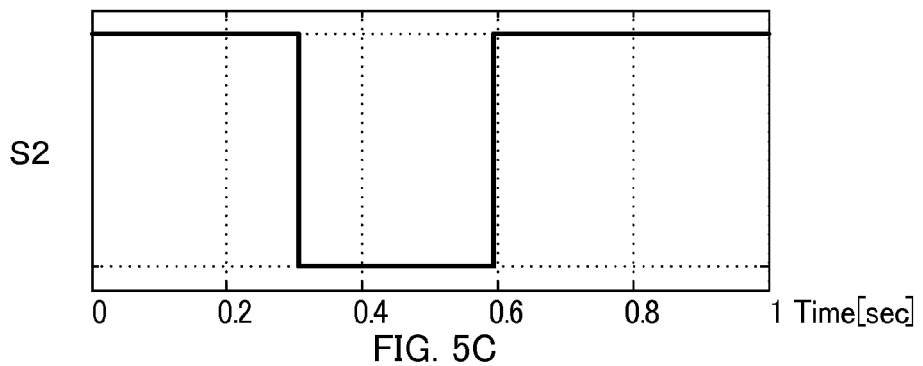
FIG. 5C is a waveform diagram of a signal S2 of a bandwidth selecting unit according to a first embodiment of the present invention.
Figure 5D:
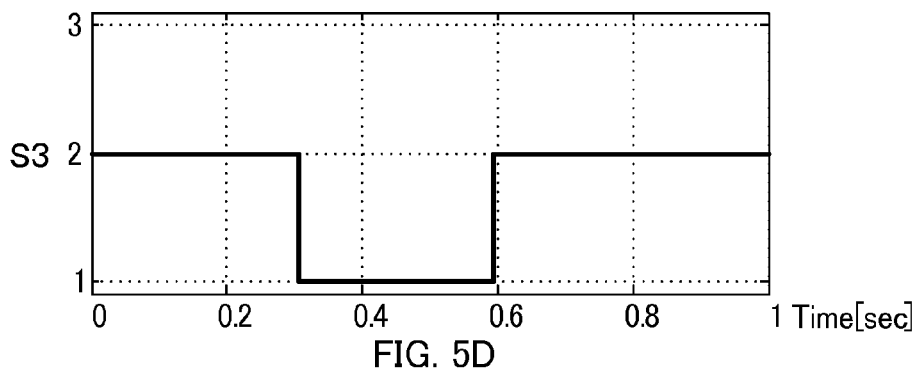
FIG. 5D is a waveform diagram of a signal S3 of a bandwidth selecting unit according to a first embodiment of the present invention.
Figure 6A:
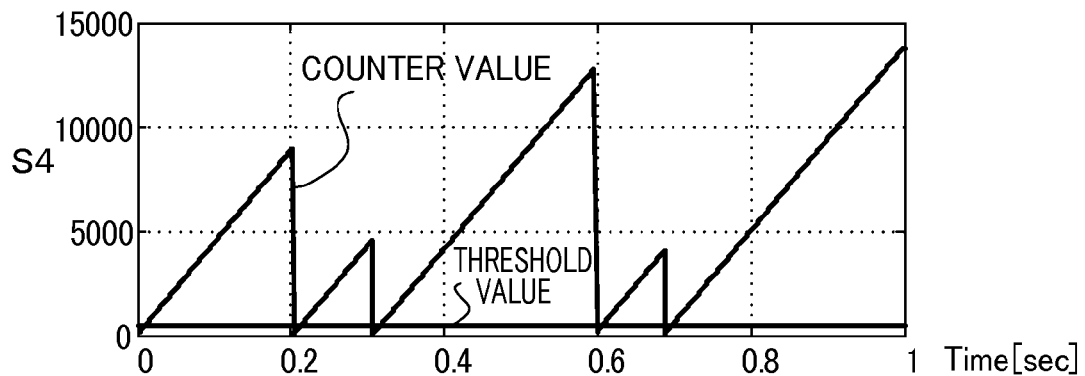
FIG. 6A is a waveform diagram of a signal S4 of a bandwidth selecting unit according to a first embodiment of the present invention.
Figure 6B:
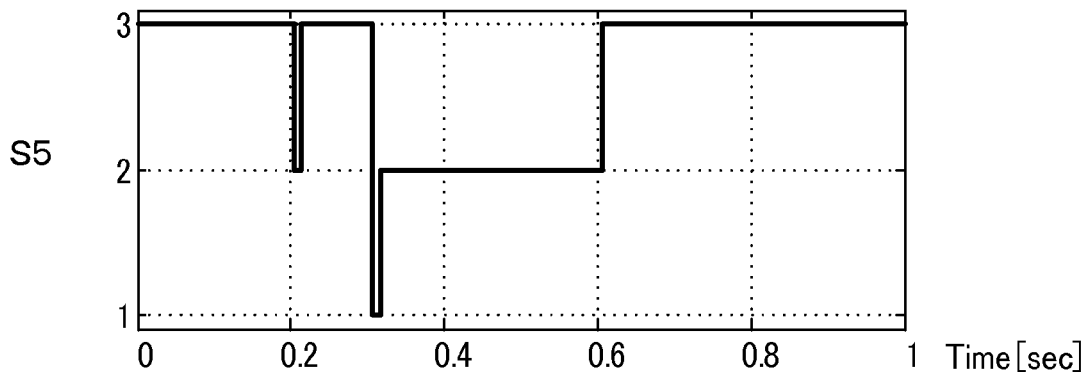
FIG. 6B is a waveform diagram of a signal S5 of a bandwidth selecting unit according to a first embodiment of the present invention.
Figure 6C:
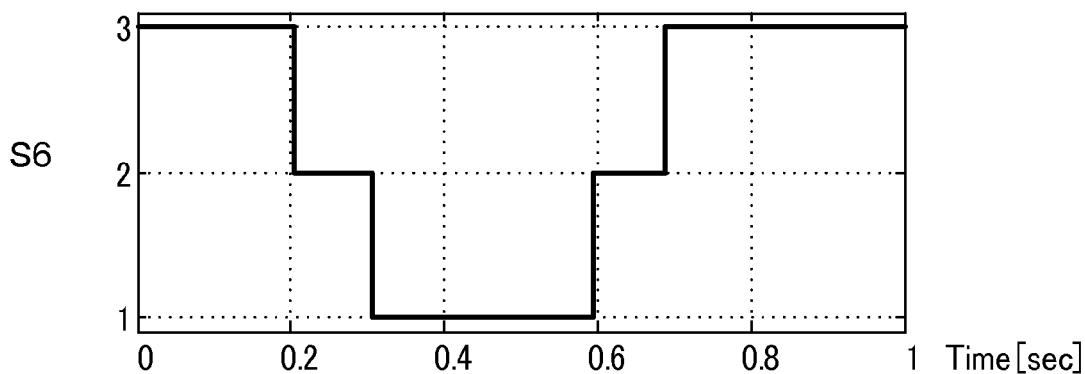
FIG. 6C is a waveform diagram of a signal S6 of a bandwidth selecting unit according to a first embodiment of the present invention.

FIG. 4 is a block diagram of a detailed exemplary configuration of the bandwidth selecting unit 262.

A comparator 2621 compares the adjacent interference signal A detected by the adjacent interference signal detecting unit 250 with the threshold value Ath1 to output a signal S1 indicating the above comparison result. In an embodiment according to the present invention, if the adjacent interference signal A is equal to or smaller than the threshold value Ath1, the signal S1 is H-level, and if the adjacent interference signal A is greater than the threshold value Ath1, the signal S1 is L-level (see FIGS. 5A and 5B).

A comparator 2622 compares the adjacent interference signal A detected by the adjacent interference signal detecting unit 250 with the threshold value Ath2 to output a signal S2 indicating the above comparison result. In an embodiment according to the present invention, if the adjacent interference signal A is equal to or smaller than the threshold value Ath2, the signal S2 is H-level, and if the adjacent interference signal A is greater than the threshold value Ath2, the signal S1 is L-level (see FIGS. 5A and 5C).

Based on the signal S2 output by the comparator 2622, a selector 2625 selects a filter index I (=1) representing the first bandwidth Bw1 stored in a register 2623 or a filter index I (=2) representing the second bandwidth Bw2 stored in a register 2624. In an embodiment according to the present invention, if the signal S2 is H-level (in the case of the adjacent interference signal A>threshold value Ath2), the filter index I (=2) of the register 2624 is selected, and if the signal S2 is L-level (in the case of the adjacent interference signal A<threshold value Ath2), the filter index I (=1) of the register 2623 is selected (see FIGS. 5C and 5D). Reference numerals 2626 to 2631 denote constituent elements for performing the band broadening control. If a count value S4 (see FIG. 6A) obtained by counting with a counter 2626 is greater than a predetermined threshold value for enabling the band broadening control, a selector 2629 selects a value obtained by incrementing the current filter index I, which is indicated by an signal S6 (see FIG. 6C) described later, by +1 with an adder 2627. That is, the band broadening control is enabled. On the other hand, if the count value S4 is smaller than the predetermined threshold value, the selector 2629 selects the value of the current filter index I, which is indicated by the signal S6 (see FIG. 6C) via a delay unit 2628 as described later. That is, the band broadening control is disabled. A comparator 2631 compares the output of the selector 2629 with a filter index I (=3) representing the third bandwidth Bw3 stored in a register 2630 and selects a smaller one to be output as a signal S5 (see FIG. 6B).

Based on the signal S1 output by the comparator 2621, a selector 2632 selects the signal S3 output by the selector 2625 or the signal S5 output by the comparator 2631, to be output as a signal S6 to the band-narrowing suppression control unit 266. In an embodiment according to the present invention, if the signal S1 is H-level (in the case of the adjacent interference signal A>threshold value Ath1), the signal S5 is selected, and if the signal S1 is L-level (in the case of the adjacent interference signal A≦threshold value Ath1), the signal S3 is selected.

Figure 7:
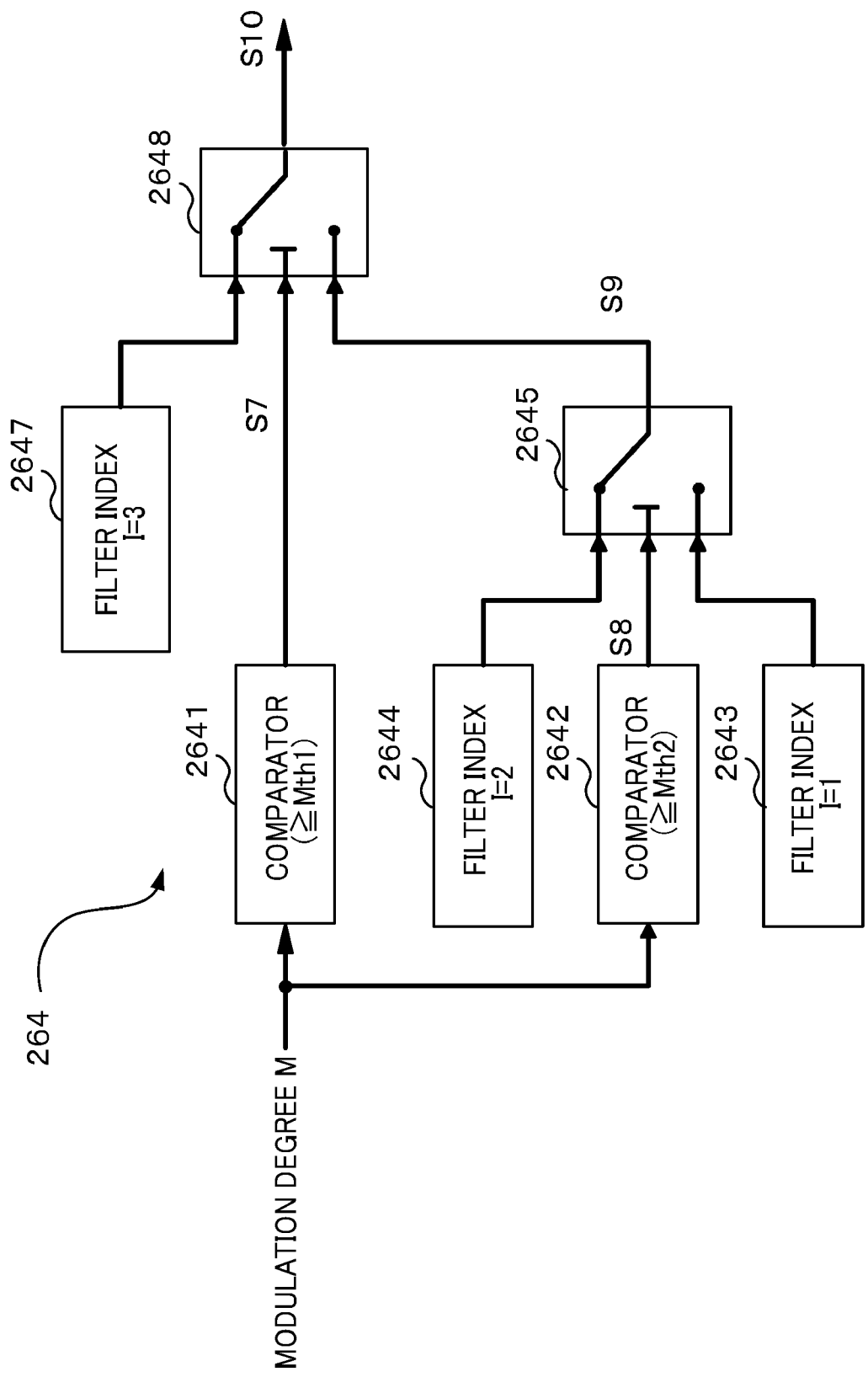
FIG. 7 is a diagram showing a configuration of a bandwidth lower limit value setting unit according to a first embodiment of the present invention.
Figure 8A:
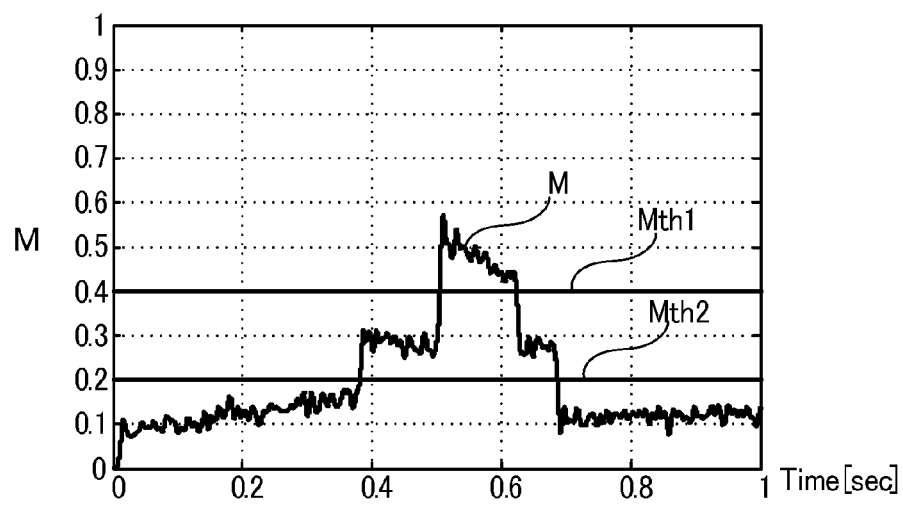
FIG. 8A is a waveform diagram showing a relationship between a modulation degree M and threshold values of a bandwidth lower limit value setting unit according to a first embodiment of the present invention.
Figure 8B:
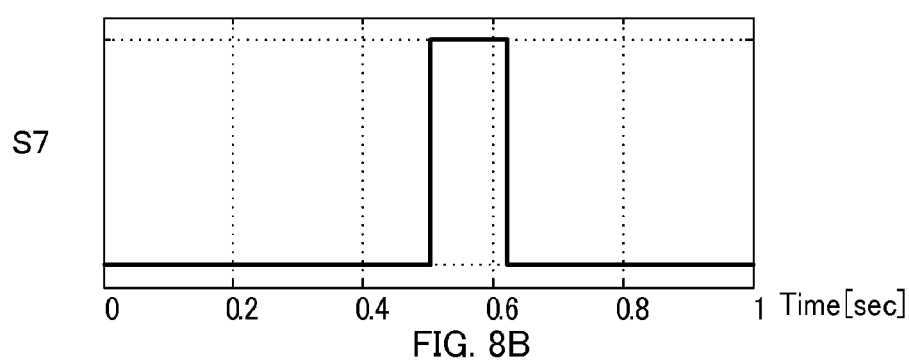
FIG. 8B is a waveform diagram of a signal S7 of a bandwidth lower limit value setting unit according to a first embodiment of the present invention.
Figure 8C:
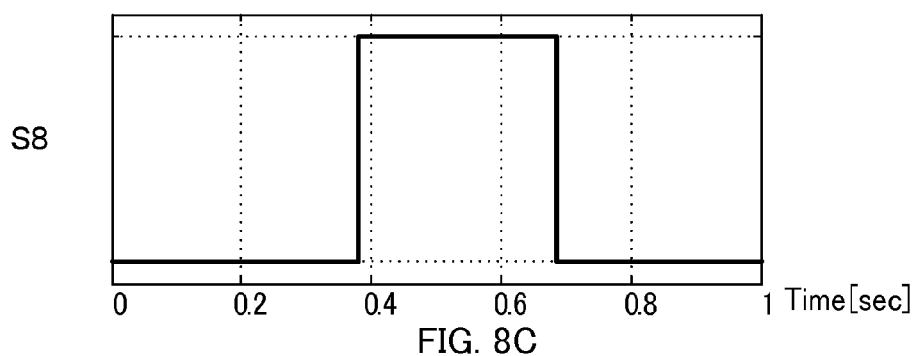
FIG. 8C is a waveform diagram of a signal S8 of a bandwidth lower limit value setting unit according to a first embodiment of the present invention.
Figure 8D:
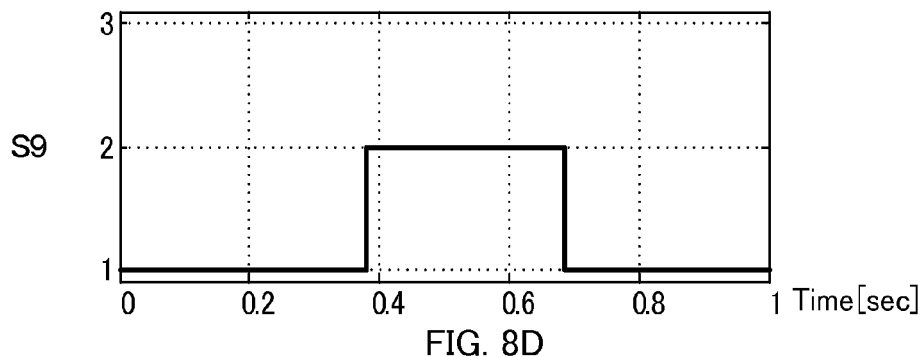
FIG. 8D is a waveform diagram of a signal S9 of a bandwidth lower limit value setting unit according to a first embodiment of the present invention.

FIG. 7 is a block diagram of a detailed exemplary configuration of the bandwidth lower limit value setting unit 264.

A comparator 2641 compares the modulation degree M detected by the modulation-degree detecting unit 252 with the threshold value Mth1 and outputs a signal S7 indicating the above comparison result. In an embodiment according to the present invention, if the modulation degree M is equal to or greater than the threshold value Mth1, the signal S7 is H-level, and if the modulation degree M is smaller than the threshold value Mth1, the signal S7 becomes L-level (see FIGS. 8A and 8B).

A comparator 2642 compares the modulation degree M detected by the modulation-degree detecting unit 252 with the threshold value Mth2 and outputs a signal S8 indicating the above comparison result. In an embodiment according to the present invention, if the modulation degree M is equal to or greater than the threshold value Mth2, the signal S8 is H-level, and if the modulation degree M is smaller than the threshold value Mth2, the signal S8 is L-level (see FIGS. 8A and 8C).

Based on the signal S8 output by the comparator 2642, a selector 2645 selects a filter index I (=1) representing the first bandwidth Bw1 stored in a register 2643 or a filter index I (=2) representing the second bandwidth Bw2 stored in a register 2644, to be output as a signal S9. In an embodiment according to the present invention, if the signal S8 is H-level (in the case of the modulation degree M>threshold value Mth2), the filter index I (=2) of the register 2644 is selected, and if the signal S8 is L-level (in the case of the modulation degree M≦threshold value Mth2), the filter index I (=1) of the register 2643 is selected (see FIGS. 8C and 8D).

Based on the signal S7 output by the comparator 2641, a selector 2648 selects the signal S9 output by the selector 2645 or the filter index I (=3) representing the third bandwidth Bw3 stored in a register 2647, to be output as a signal S10 to the band-narrowing suppression control unit 266. In an embodiment according to the present invention, if the signal S7 is H-level (in the case of the modulation degree M>threshold value Mth1), the filter index I (=3) of the register 2647 is selected, and if the signal S7 is L-level (in the case of the modulation degree M≦threshold value Mth1), the signal S9 is selected.

Figure 9A:
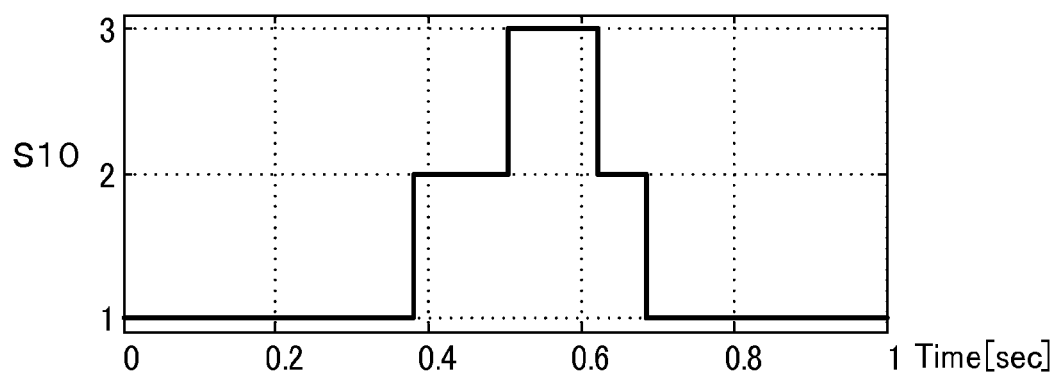
FIG. 9A is a waveform diagram of a signal S10 supplied from a bandwidth lower limit value setting unit to a band-narrowing suppression control unit according to a first embodiment of the present invention.
Figure 9B:
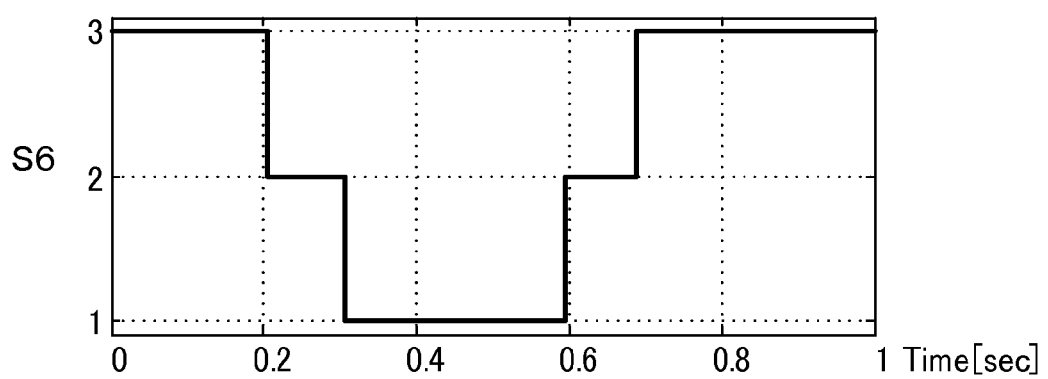
FIG. 9B is a waveform diagram of a signal S6 supplied from a bandwidth setting unit to a band-narrowing suppression control unit according to a first embodiment of the present invention.
Figure 9C:
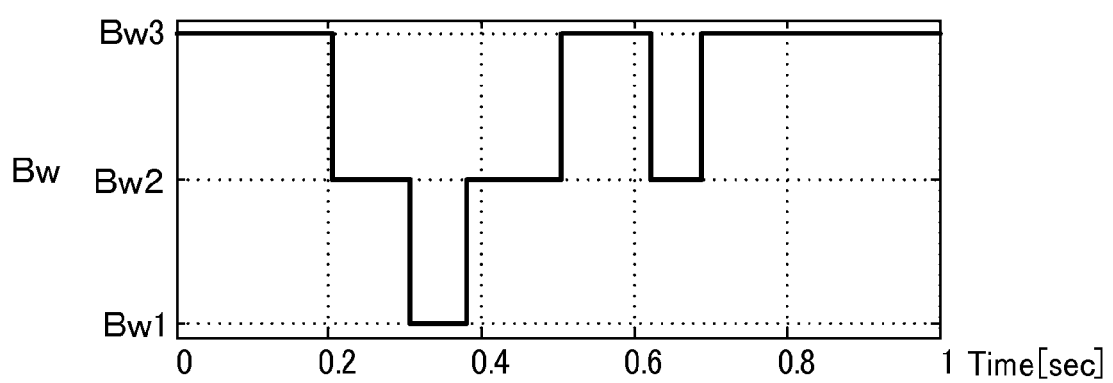
FIG. 9C is a waveform diagram of a pass bandwidth Bw to be set in a band-narrowing suppression control unit according to a first embodiment of the present invention.

With a configuration described above, the band-narrowing suppression control unit 266 can select a larger one from the signal S10 (see FIG. 9A) supplied from the bandwidth lower limit value setting unit 264 shown in FIG. 7 and the signal S6 (see FIG. 9B) supplied from the bandwidth selecting unit 262 shown in FIG. 4, to be set as the pass bandwidth Bw of the IF variable band-pass filter unit 210 (seed FIG. 9C).

Second Embodiment

==Overall Configuration of Receiving Apparatus==

Figure 10:
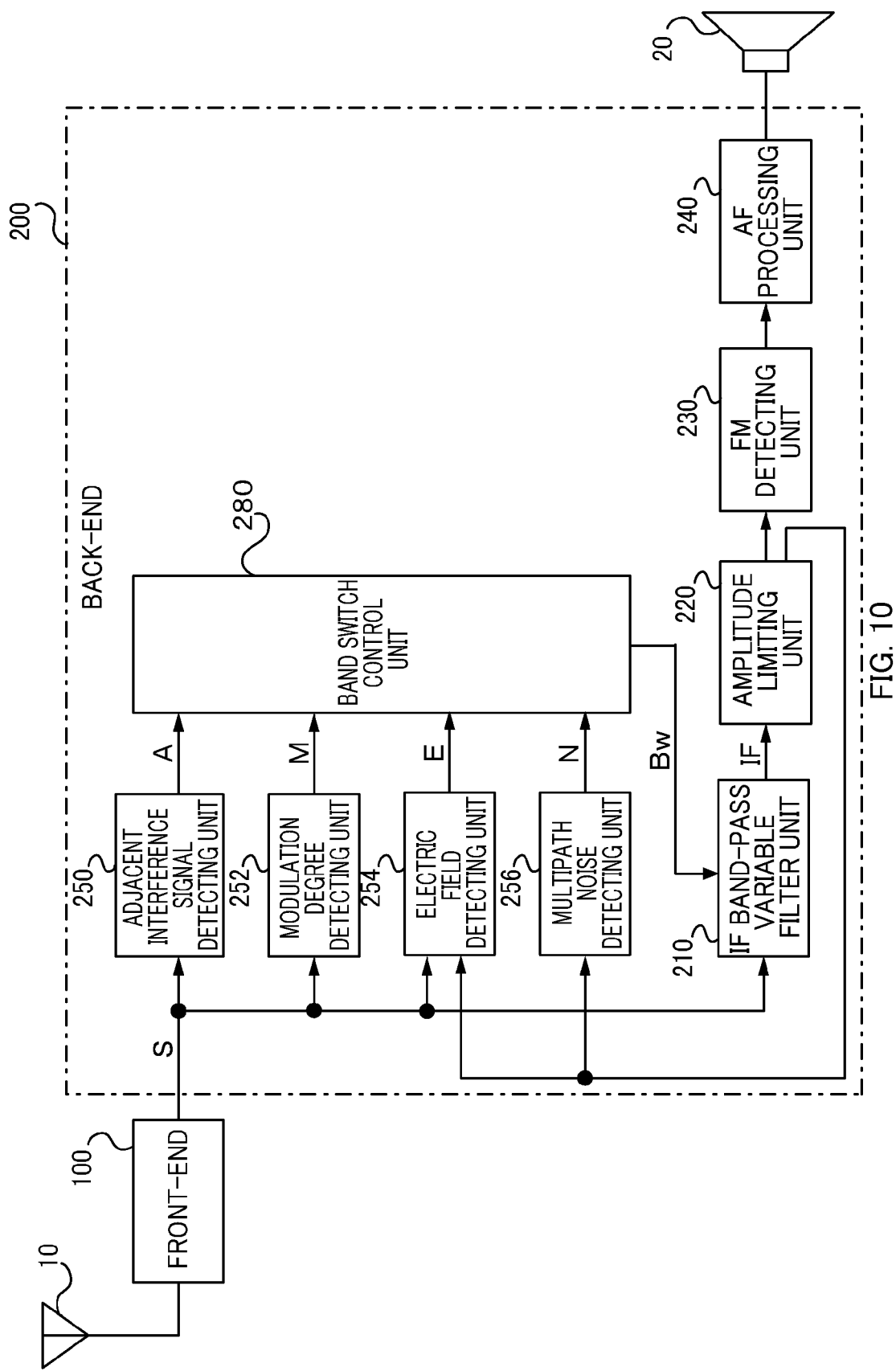
FIG. 10 is a diagram showing a configuration of a receiving apparatus including a band switch control apparatus for an intermediate frequency filter according to a second embodiment of the present invention.

FIG. 10 depicts an overall configuration of a receiving apparatus including a band switch control apparatus for an intermediate frequency filter according to a second embodiment of the present invention. As in the case with the receiving apparatus shown in FIG. 1, the receiving apparatus of FIG. 10 is assumed to be a superheterodyne FM monaural receiver.

Differences between the configuration shown in FIG. 1 and that shown in FIG. 10 are that the band switch control apparatus for the intermediate frequency filter of a second embodiment additionally includes an electric field intensity detecting unit 254 and a multipath noise detecting unit 256 and that the band switch control unit 260 performing band switching based on the adjacent interference signal A and the modulation degree M is changed into a band switch control unit 280 performing band switching based on the electric field intensity E and the multipath noise N in addition to the adjacent interference signal A and the modulation degree M. The same constituent elements as the receiving apparatus shown in FIG. 1 are given the same reference numerals and description thereof will be omitted.

The electric field intensity detecting unit 254 detects the electric field intensity E of the reception signal received with the antenna 10 by using a digital signal S, obtained by performing A/D conversion for the output of the front-end 100 with an A/D convertor not shown, and the output of the amplitude limiting unit 220. The electric field intensity E can be detected with the use of an arrangement of a so-called S-meter.

The multipath noise detecting unit 256 detects the multipath noise N superimposed on the reception signal by using the output of the amplitude limiting unit 220. The multipath noise N is noise appearing in the reception signal received with the antenna 10 under the multipath environment where the signal goes through various paths. The multipath noise N can be detected, for example, by monitoring change in level of the output (IF signal) of the amplitude limiting unit 220 to be compared with a predetermined slice level.

Figure 11:
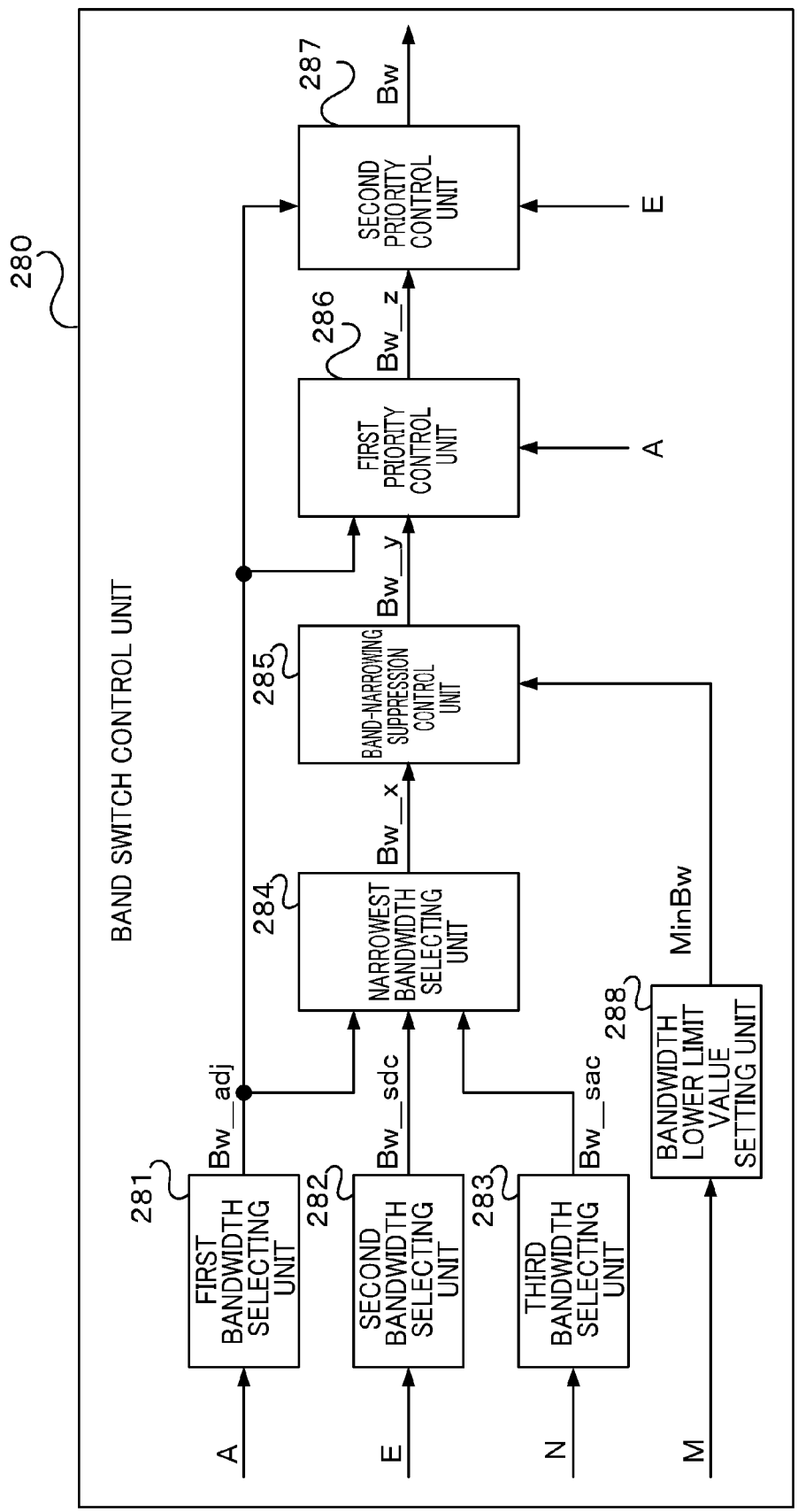
FIG. 11 is a diagram showing a configuration of a band switch control unit according to a second embodiment of the present invention.

The band switch control unit 280 includes first to third bandwidth selecting units 281, 282, and 283, a narrowest bandwidth selecting unit 284, a band-narrowing suppression control unit 285, a first priority control unit 286, and a second priority control unit 287, as shown in FIG. 11. The constituent elements of the band switch control unit 280 will hereinafter be described in detail with reference to waveform charts of FIGS. 13 to 16.

The first bandwidth selecting unit 281 selects a first pass bandwidth Bw_adj (see FIG. 13A) of the IF variable band-pass filter unit 210 corresponding to the amplitude of the adjacent interference signal A according to patterns defined in advance. Similarly, the second bandwidth selecting unit 282 selects a second pass bandwidth Bw_sdc (see FIG. 13B) of the IF variable band-pass filter unit 210 corresponding to the electric field intensity E according to patterns defined in advance, and the third bandwidth selecting unit 283 selects a third pass bandwidth Bw_sac (see FIG. 13C) of the IF variable band-pass filter unit 210 corresponding to the amplitude (level) of the multipath noise N according to patterns defined in advance.

The selection by the first to third bandwidth selecting units 281, 282, and 283 is made in the same way as the selection by the bandwidth selecting unit 262 of a first embodiment (the processing from S202 to S206 of FIG. 2). That is, the first to third bandwidth selecting units 281, 282, and 283 can be implemented with the block configuration shown in FIG. 4, and the band is narrowed as the adjacent interference signal A, the electric field intensity E, or the multipath noise N increases and the band is broadened as the adjacent interference signal A, the electric field intensity E, or the multipath noise N decreases.

Figure 13A:
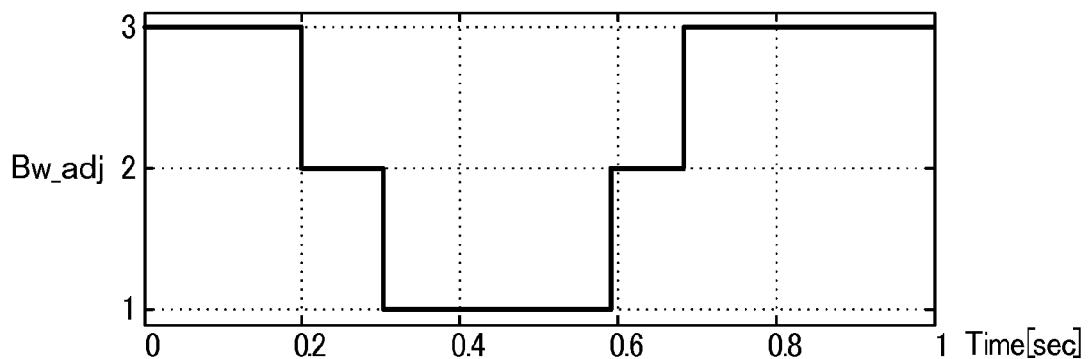
FIG. 13A is a waveform diagram of a signal in a pass bandwidth Bw_adj of a band switch control unit according to a second embodiment of the present invention.
Figure 13B:
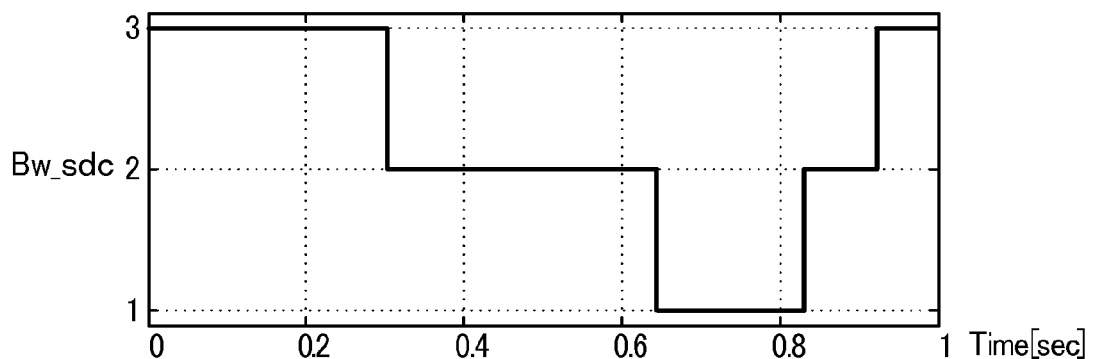
FIG. 13B is a waveform diagram of a signal in a pass bandwidth Bw_sdc of a band switch control unit according to a second embodiment of the present invention.
Figure 13C:
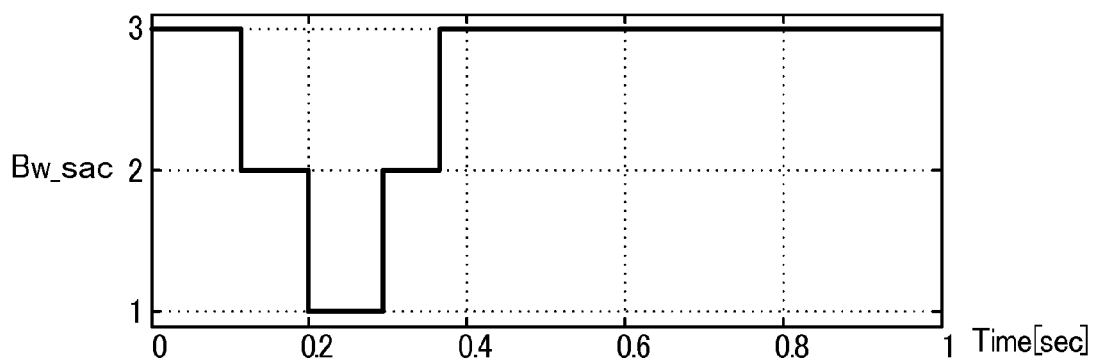
FIG. 13C is a waveform diagram of a signal in a pass bandwidth Bw_sac of a band switch control unit according to a second embodiment of the present invention.
Figure 14A:
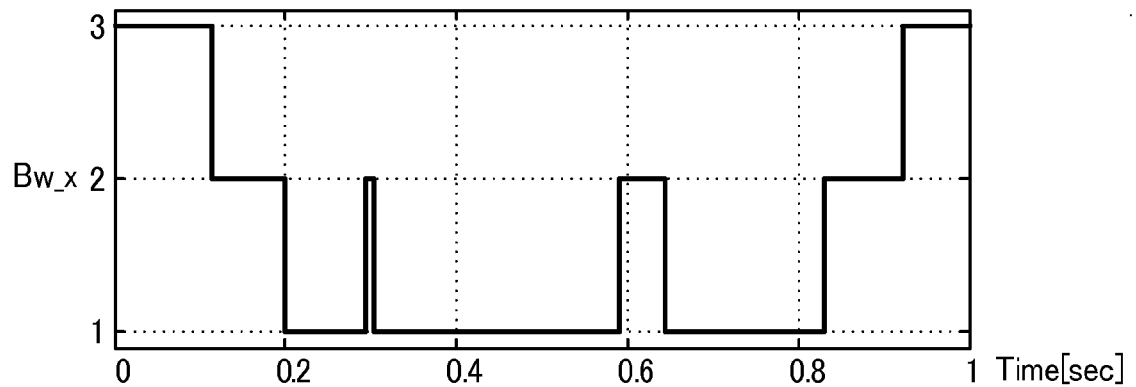
FIG. 14A is a waveform diagram of a signal in a narrowest bandwidth Bw_x of a band switch control unit according to a second embodiment of the present invention.
Figure 14B:
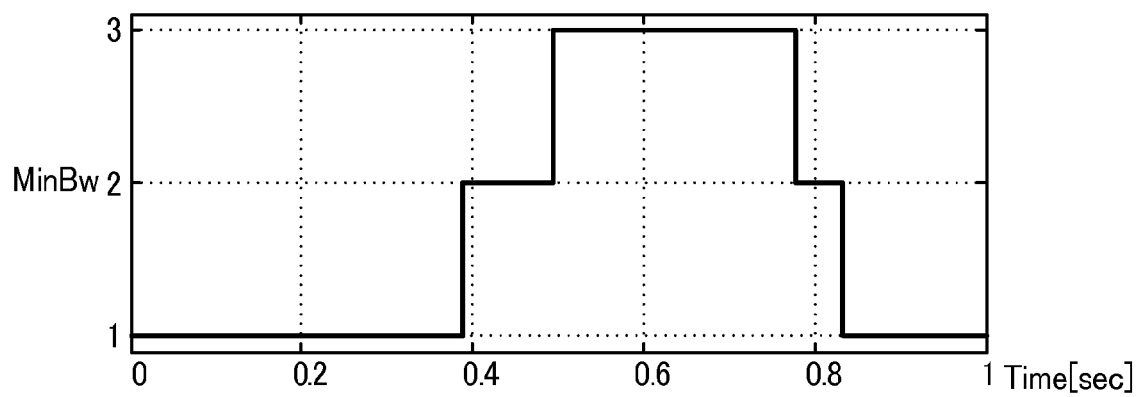
FIG. 14B is a waveform diagram of a bandwidth lower limit value MinBw to be set in a band switch control unit according to a second embodiment of the present invention.
Figure 14C:
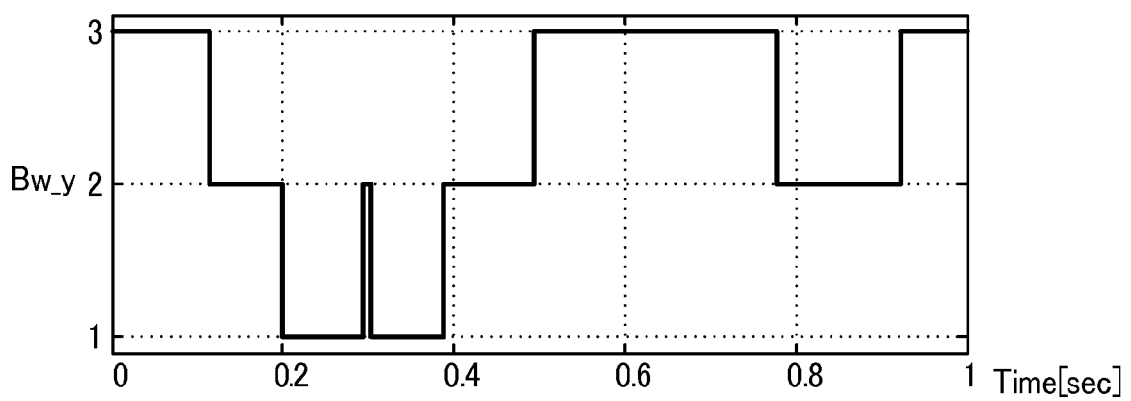
FIG. 14C is a waveform diagram of a signal in a pass bandwidth Bw_y of a band switch control unit according to a second embodiment of the present invention.

The narrowest bandwidth selecting unit 284 selects the narrowest bandwidth Bw_x (see FIG. 14A) which is the narrowest among the first pass bandwidth Bw_adj (see FIG. 13A), the second pass bandwidth Bw_sdc (see FIG. 13B), and the third pass bandwidth Bw_sac (see FIG. 13C).

The band-narrowing suppression control unit 285 performs band-narrowing suppression control by using the narrowest bandwidth Bw_x (see FIG. 14A) selected by the narrowest bandwidth selecting unit 284 and the pass bandwidth lower limit value MinBw (see FIG. 14B) set based on the modulation degree M by a bandwidth lower limit value setting unit 288. Specifically, the same control as that of the band-narrowing suppression control unit 266 of a first embodiment is performed (the processing from S207 to S213 of FIG. 2). The bandwidth lower limit value setting unit 288 can be implemented with the block configuration shown in FIG. 7.

Figure 15A:
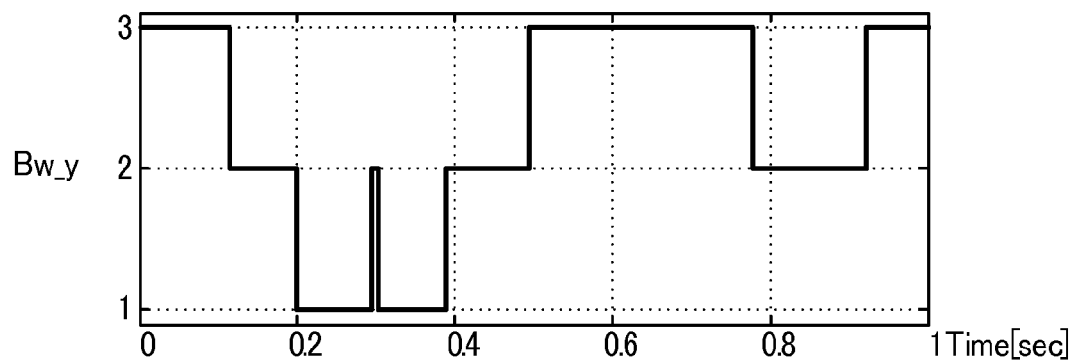
FIG. 15A is a waveform diagram of a signal in a pass bandwidth Bw_y of a band switch control unit according to a second embodiment of the present invention.
Figure 15B:
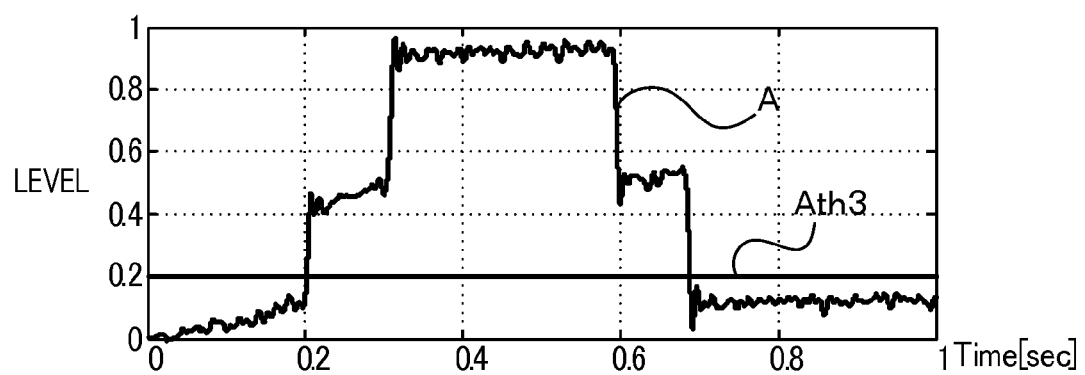
FIG. 15B is a waveform diagram of a relationship between an adjacent interference signal and threshold values in a band switch control unit according to a second embodiment of the present invention.
Figure 15C:
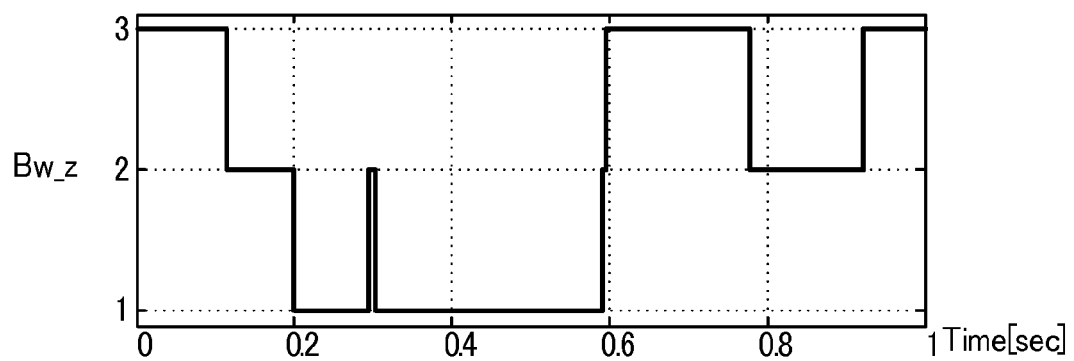
FIG. 15C is a waveform diagram of a signal in a pass bandwidth Bw_z of a band switch control unit according to a second embodiment of the present invention.

The first priority control unit 286 selects either a pass bandwidth Bw_y (see FIG. 15A), selected in two steps with the narrowest bandwidth selecting unit 284 and the band-narrowing suppression control unit 285, or the first pass bandwidth Bw_adj (see FIG. 13A), selected by the first bandwidth selecting unit 281 based on the detected amplitude of the adjacent interference signal A (see FIG. 15B). Specifically, since the modulation M may not accurately be detected due to the effect of the adjacent interference signal, if the adjacent interference signal A is greater than a predetermined threshold value Ath3, the first bandwidth Bw_adj is preferentially selected (see FIGS. 13A and 15A to 15C).

Figure 16A:
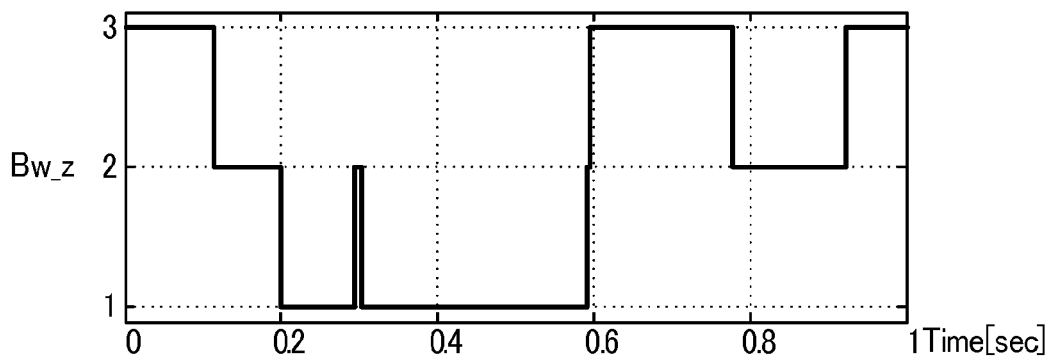
FIG. 16A is a waveform diagram of a signal in a pass bandwidth Bw_z of a band switch control unit according to a second embodiment of the present invention.
Figure 16B:
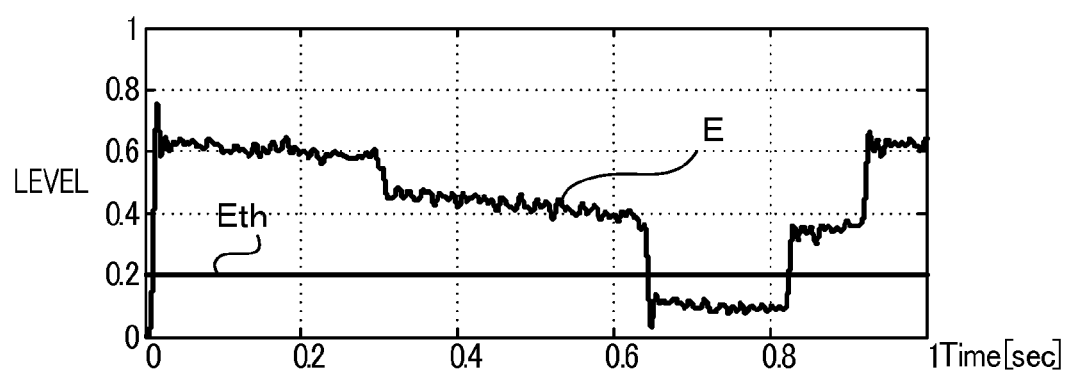
FIG. 16B is a waveform diagram showing a relationship between electric field intensity and a threshold value in a band switch control unit according to a second embodiment of the present invention.
Figure 16C:
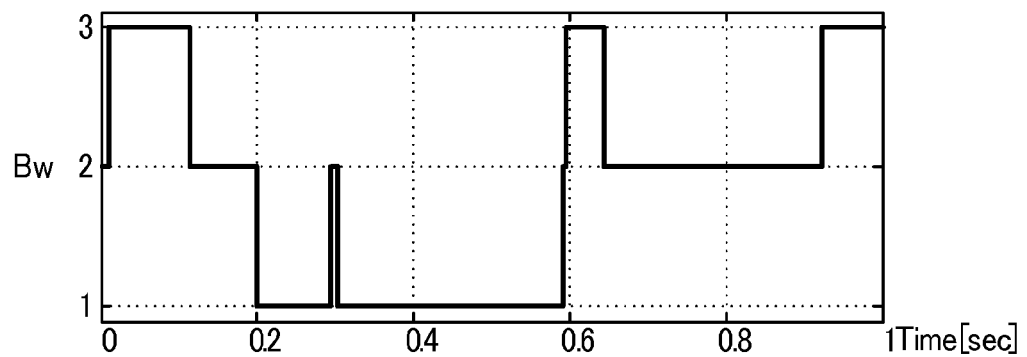
FIG. 16C is a waveform diagram of a signal of a pass bandwidth Bw of a band switch control unit according to a second embodiment of the present invention.
Figure 17:
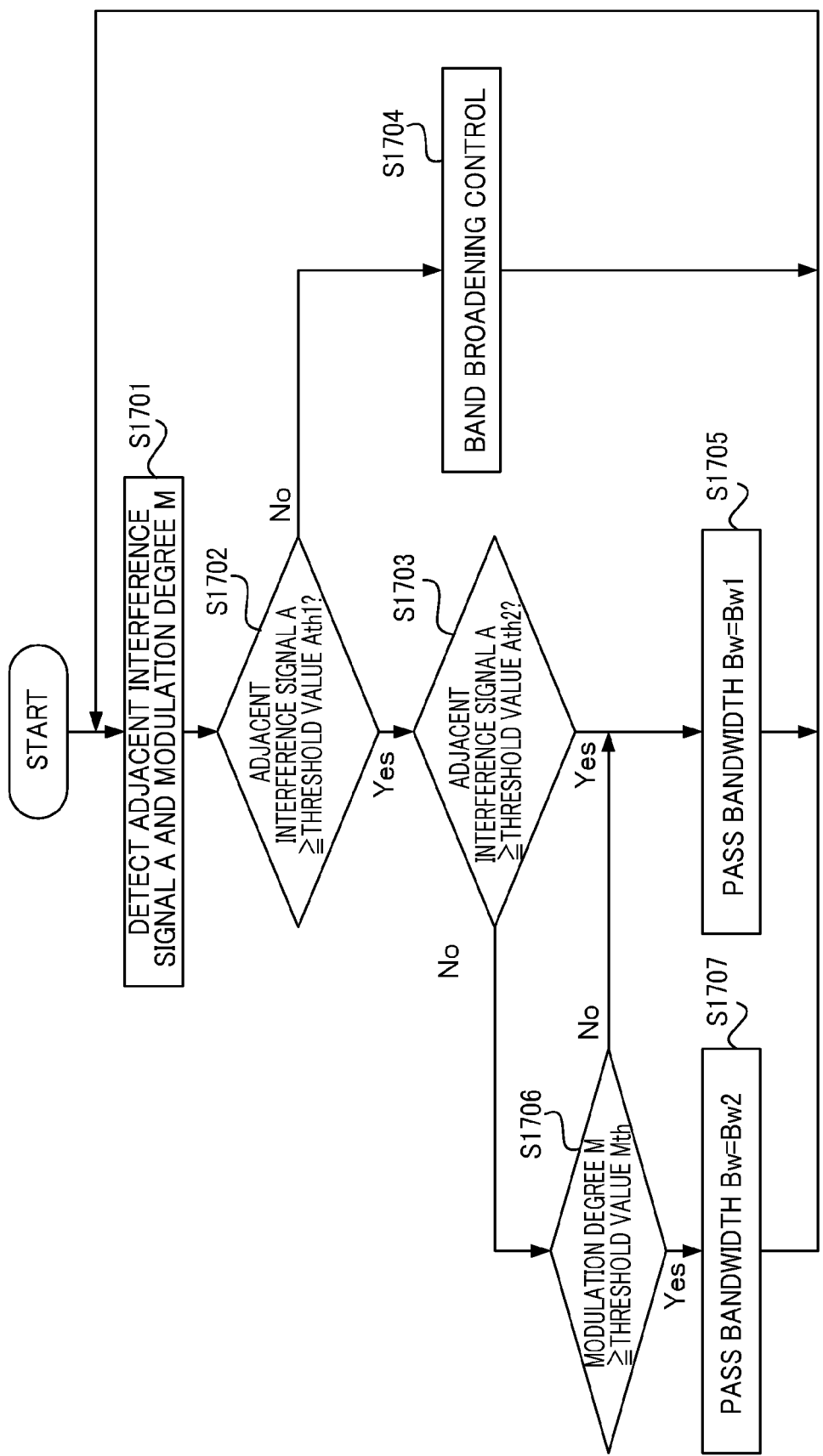
FIG. 17 is a flowchart of an intermediate frequency filter band switch process flow.

The second priority control unit 287 selects either a pass bandwidth Bw_z (see FIG. 16A), selected by the first priority control unit 286, or the first pass bandwidth Bw_adj (see FIG. 13A), selected by the first bandwidth selecting unit 281, based on the detected electric field intensity E (see FIG. 16B). Specifically, since the modulation degree M may not accurately be detected due to the effect of the weak electric field, the first bandwidth Bw_adj is preferentially selected in the case of the weak electric field having the electric field intensity E smaller than a threshold value Eth (see FIGS. 13A and 16A to 16C). The pass bandwidth selected by the second priority control unit 287 is set as the pass bandwidth Bw of the IF variable band-pass filter unit 210.

==Outline of Intermediate Frequency Filter Band Switch Processing==

Figure 12:
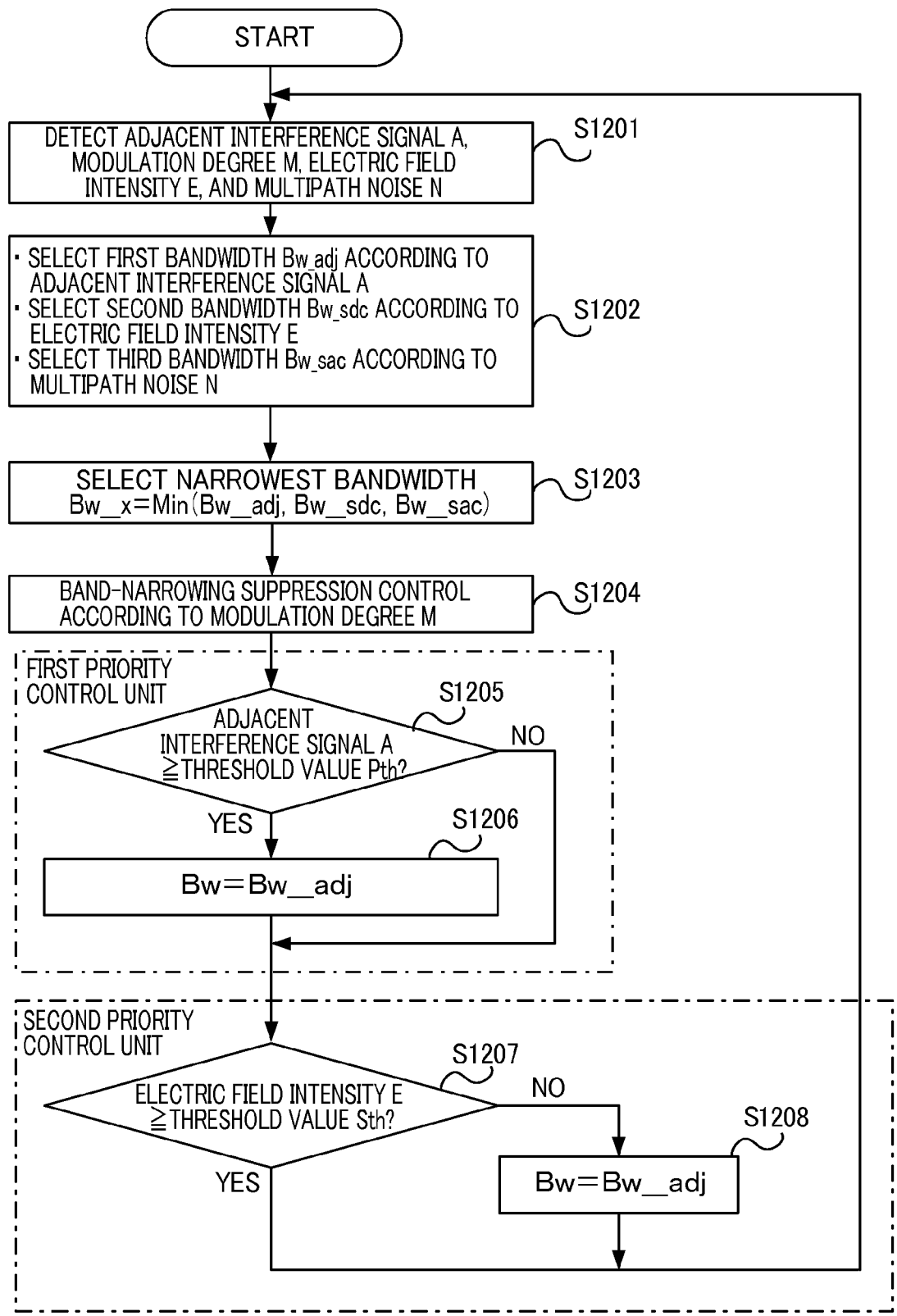
FIG. 12 is a flowchart of a band switching process of a band switch control apparatus for an intermediate frequency filter according to a second embodiment of the present invention.

FIG. 12 is an explanatory flowchart of an outline of a band switch processing by the band switch control apparatus for the intermediate frequency filter according to a second embodiment shown in FIGS. 10 and 11. The following processing from S1205 to S1206 is performed by the first priority control unit 286 and the following processing from S1207 to S1208 is performed by the second priority control unit 287.

First, the adjacent interference signal A, the modulation degree M, the electric field intensity E, and the multipath noise N are detected from the reception signal received with the antenna 10 (S1201). The first to third bandwidth selecting units 281, 282, and 283 selects the first pass bandwidth Bw_adj, the second pass bandwidth Bw_sdc, and the third pass bandwidth Bw_sac, respectively (S1202).

The narrowest bandwidth selecting unit 284 then selects the narrowest one among the first pass bandwidth Bw_adj, the second pass bandwidth Bw_sdc, and the third pass bandwidth Bw_sac (S1203). The band-narrowing suppression control unit 285 performs the band-narrowing suppression control based on the modulation degree M for the narrowest bandwidth Bw_x selected by the narrowest bandwidth selecting unit 284 (S1204). As a result, the band narrowing control and the band-narrowing suppression control are performed by using one most likely to cause deterioration of the detection accuracy among the adjacent interference signal A, the electric field intensity E, and the multipath noise N.

The first priority control unit 286 compares the amplitude of the adjacent interference signal A with a predetermined threshold value Pth (S1205). If the amplitude of the adjacent interference signal A is greater than the threshold value Pth (S1205: YES), the first bandwidth Bw_adj is preferentially selected as the pass bandwidth Bw since the band-narrowing suppression control based on the modulation degree M may malfunction (S1206). On the other hand, if the amplitude of the adjacent interference signal A is smaller than the threshold value Pth (S1205: NO), the band-narrowing suppression control unit 285 selects the pass bandwidth Bw_y satisfying the condition that the bandwidth is equal to or greater than the pass bandwidth lower limit value MinBw.

The second priority control unit 287 compares the electric field intensity E with a threshold value Sth (S1207). If the electric field intensity E is greater than the threshold value Sth (S1207: YES), it is determined that the electric field is not a weak electric field, so that the pass bandwidth Bw_z selected by the first priority control unit 286 is selected, as it is. On the other hand, If the electric field intensity E is smaller than the threshold value Sth (S1207: NO), it is determined that the electric field is a weak electric field, so that the first pass bandwidth Bw_adj is selected (S1208).

As described above, the proportion of noise to the signal can be improved at the time of the weak electric field and under the multipath environment by performing the band narrowing control with the use of the electric field intensity E and the multipath noise N in addition to the adjacent interference signal A. The pass bandwidth Bw of the IF variable band-pass filter unit 210 is switched in two steps, which are the band narrowing control based on the adjacent interference signal A, the electric field intensity E, and the multipath noise N and the band-narrowing suppression control based on the modulation degree M, and therefore, a good reception state can be achieved where the interference based on the amplitude of the adjacent interference signal A, the noise based on the electric field intensity E and the multipath noise N, and the waveform distortion based on the modulation degree M are suppressed in a balanced manner.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A band switch control apparatus for an intermediate frequency filter comprising:
    an adjacent interference signal detecting unit configured to detect an adjacent interference signal superimposed on a reception signal having a frequency tuned to a desired frequency, the adjacent interference signal having a frequency adjacent to the desired frequency;
    a modulation-degree detecting unit configured to detect a modulation degree of the reception signal;
    a bandwidth selecting unit configured to select a pass bandwidth of the in frequency filter corresponding to an amplitude of the adjacent interference signal; and
    a band-narrowing suppression control unit configured to select a lower limit value of the pass bandwidth of the intermediate frequency filter corresponding to the demodulation degree, the intermediate frequency filter being configured to pass, with a variable pass bandwidth, an intermediate frequency signal obtained by frequency converting the reception signal, and change the pass bandwidth selected by the bandwidth selecting unit to the lower limit value, if the pass bandwidth selected by the bandwidth selecting unit is smaller than the lower limit value thereby increasing the pass bandwidth to the lower limit value.

2. The band switch control apparatus for the intermediate frequency filter of claim 1, further comprising
    an electric field intensity detecting unit configured to detect electric field intensity of the reception signal, wherein
    the bandwidth selecting unit selects the pass bandwidth of the intermediate frequency filter corresponding to the amplitude of the adjacent interference signal and the electric field intensity.

3. The band switch control apparatus for the intermediate frequency filter of claim 1, further comprising
    a multipath noise detecting unit configured to detect multipath noise superimposed on the reception signal, wherein
    the bandwidth selecting unit selects the pass bandwidth of the intermediate frequency filter corresponding to the amplitude of the adjacent interference signal and the amplitude of the multipath noise.

4. The band switch control apparatus for the intermediate frequency filter of claim 1, further comprising:
    an electric field intensity detecting unit configured to detect electric field intensity of the reception signal; and
    a multipath noise detecting unit configured to detect multipath noise superimposed on the reception signal, wherein
    the bandwidth selecting unit selects the pass bandwidth narrowest among a first bandwidth of the intermediate frequency filter corresponding to the amplitude of the adjacent interference signal, a second bandwidth of the intermediate frequency filter corresponding to the electric field intensity, and a third bandwidth of the intermediate frequency filter corresponding to the amplitude of the multipath noise.

5. The band switch control apparatus for the intermediate frequency filter of claim 1, further comprising
    a first priority control unit configured to preferentially select the pass bandwidth corresponding to the amplitude of the adjacent interference signal selected by the bandwidth selecting unit rather than the pass bandwidth selected based on the modulation degree by the band-narrowing suppression control unit, if the amplitude of the adjacent interference signal is greater than, a predetermined threshold.

6. The band switch control apparatus for the intermediate frequency filter of claim 1, further comprising:
    an electric field intensity detecting unit configured to detect electric field intensity of the reception signal; and
    a second priority control unit configured to preferentially select the pass bandwidth corresponding to the amplitude of the adjacent interference signal selected by the bandwidth selecting unit rather than the pass bandwidth selected based on the modulation degree by the band-narrowing suppression control unit, if the electric field intensity is smaller than a predetermined threshold.

7. The band switch control apparatus of claim 1 wherein the bandwidth selecting unit is configured to select the pass bandwidth of the intermediate frequency filter corresponding to the amplitude of the adjacent interference signal and not the modulation degree.

8. The band switch control apparatus of claim 1 wherein the band-narrowing suppression control unit is configured to select a lower limit value of the pass bandwidth of the intermediate frequency filter corresponding to the demodulation degree and not the amplitude of the adjacent interference signal.

9. A band switch control apparatus for an intermediate frequency filter comprising:
   an adjacent interference signal detecting unit configured to detect an adjacent interference signal superimposed on a reception signal having a frequency tuned to a desired frequency, the adjacent interference signal having a frequency adjacent to the desired frequency;
   a modulation-degree detecting unit configured to detect a modulation degree of the reception signal;
   a bandwidth selecting unit configured to select a pass bandwidth of the intermediate frequency filter corresponding to the amplitude of the adjacent interference signal; and
   a band-narrowing suppression control unit configured to
      select a lower limit value of the pass bandwidth of the intermediate frequency filter corresponding to the demodulation degree, the intermediate frequency filter being configured to pass, with a variable pass bandwidth, an intermediate frequency signal obtained by frequency converting the reception signal, and
      change the pass bandwidth selected by the bandwidth selecting unit to the lower limit value, if the pass bandwidth selected by the bandwidth selecting unit is smaller than the lower limit value,
   and wherein the bandwidth selecting unit is further configured to select
      a first bandwidth as the pass bandwidth of the intermediate frequency filter if the amplitude of the adjacent interference signal is greater than a first threshold value,
      a second bandwidth broader than the first bandwidth as the pass bandwidth of the intermediate frequency filter if the amplitude of the adjacent interference signal is within a range from a second threshold value smaller than the first threshold value to the first threshold value, and
      a band broadening control for broadening the intermediate frequency filter step-by-step if the amplitude of the adjacent interference signal is smaller than the second threshold value,
   and wherein the band-narrowing suppression control unit is further configured to select
      a third bandwidth broader than the second bandwidth as the lower limit value if the modulation degree is greater than a third threshold value,
      the second bandwidth as the lower limit value if the modulation degree is within a range from a fourth threshold value smaller than the third threshold value to the third threshold value, and
      the first bandwidth as the lower limit value if the modulation degree is smaller than the fourth threshold value.

10. A method of forming a control apparatus for an intermediate frequency filter comprising:
   configuring the control apparatus to detect an adjacent interference signal superimposed on a reception signal having a frequency tuned to a desired, frequency including configuring the control apparatus to select a first value of a pass bandwidth of the intermediate frequency filter corresponding to an amplitude of the adjacent interference signal, the adjacent interference signal having a frequency adjacent to the desired frequency;
   configuring the control apparatus to detect a modulation degree of the reception signal and to select a lower limit value of the pass bandwidth of the intermediate frequency filter corresponding to the demodulation degree, the intermediate frequency filter being configured to pass, with a variable pass bandwidth, an intermediate frequency signal obtained by frequency converting the reception signal, and
   configuring the control apparatus to change the first value of the pass bandwidth to the lower limit value if the lower limit value is greater than the first value.

11. The method of claim 10 wherein configuring the control apparatus to select the first value of the pass bandwidth includes configuring the control apparatus to select the first value of the pass bandwidth of the intermediate frequency filter corresponding to the amplitude of the adjacent interference signal and not corresponding to the modulation degree.

12. The method of claim 10 wherein configuring the control apparatus to detect the modulation degree of the reception signal and to select the lower limit value of the pass bandwidth includes configuring the control apparatus to select the lower limit value of the pass bandwidth of the intermediate frequency filter corresponding to the demodulation degree and not corresponding to the amplitude of the adjacent signal.

\* \* \* \* \*